US012670448B2

(12) United States Patent
Ammar et al.

(10) Patent No.: US 12,670,448 B2
(45) Date of Patent: Jun. 30, 2026

(54) PERSONALIZING A SHARED RIDE IN A MOBILITY-ON-DEMAND SERVICE

(71) Applicant: Toyota Motor Engineering & Manufacturing North America, Inc., Plano, TX (US)

(72) Inventors: Nejib Ammar, Mountain View, CA (US); Akila C. Ganlath, Mountain View, CA (US); Prashant Tiwari, Mountain View, CA (US)

( * ) Notice: Subject to any disclaimer, the term of this patent is extended or adjusted under 35 U.S.C. 154(b) by 24 days.

(21) Appl. No.: 17/222,723

(22) Filed: Apr. 5, 2021

(65) Prior Publication Data

US 2022/0318691 A1     Oct. 6, 2022

(51) Int. Cl.
G06Q 10/00      (2026.01)
G06Q 10/02      (2012.01)
G06Q 30/0201    (2023.01)
G06Q 30/0203    (2023.01)

(52) U.S. Cl.
CPC ......... G06Q 10/02 (2013.01); G06Q 30/0201 (2013.01); G06Q 30/0203 (2013.01)

(58) Field of Classification Search
USPC ......................................................... 705/5
See application file for complete search history.

(56) References Cited

U.S. PATENT DOCUMENTS 8,825,222 B2   9/2014   Namburu et al.
10,720,059 B2  7/2020   Bartel 2012/0131014 A1*   5/2012   Williamson ............ G06F 17/17
                                                        707/E17.084
2015/0204684 A1*   7/2015   Rostamian ........... G06Q 10/101
                                                        701/537
2016/0304045 A1    10/2016  Cuddihy et al.
2018/0089605 A1*   3/2018   Poornachandran ..........................
                                                        G06Q 30/0282

(Continued)

FOREIGN PATENT DOCUMENTS

CN          109074621       12/2018

OTHER PUBLICATIONS

How to tell the difference between a model and a digital twin Wright https://amses-journal.springeropen.com/track/pdf/10.1186/s40323-020-00147-4.pdf (Year: 2020).*

(Continued)

*Primary Examiner* — Tonya Joseph
(74) *Attorney, Agent, or Firm* — Burbage Law, P.C.; Jon-Michael Burbage

(57)          ABSTRACT

The disclosure includes embodiments of personalizing a shared ride in a mobility-on-demand service using a response matrix. A method includes receiving feedback from a first set of users that share a first shared ride, wherein feedback describes their individual satisfaction with the first shared ride. The method includes updating, by the processor, a response matrix to include the feedback, wherein the response matrix includes digital data describing historical user satisfaction with a plurality of shared rides over time. The method includes matching, by the processor, a second set of users to a second shared ride based on service profile data for the users, vehicle data for vehicles, and the response matrix so that the satisfaction of the second set of users with the second shared ride is improved based on the response matrix.

20 Claims, 8 Drawing Sheets

Example identifiers for the responses of the users to a plurality of attributes

(56) References Cited

U.S. PATENT DOCUMENTS

| | | | |
|---|---|---|---|
| 2018/0224866 A1* | 8/2018 | Alonso-Mora | .......... G06N 5/04 |
| 2019/0066249 A1* | 2/2019 | Decaluwe | .......... G06Q 30/0282 |
| 2019/0191265 A1* | 6/2019 | Altintas | .................. H04W 4/70 |
| 2019/0265948 A1 | 8/2019 | Goyal et al. | |
| 2020/0079385 A1 | 3/2020 | Beaurepaire et al. | |

OTHER PUBLICATIONS

"Looking to the Future of Truck Technology" Fleet Owner Marsh, Aaron https://www.fleetowner.com/technology/article/21695524/looking-to-the-future-of-future-truck-technology (Year: 2017).*

* cited by examiner

300

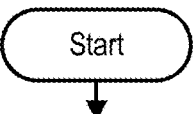
Start

Receive feedback from a first set of users that share a first shared ride, wherein the feedback describes their individual satisfaction with the first shared ride

305

Update, by a processor, a response matrix to include the feedback, wherein the response matrix includes digital data describing historical user satisfaction with a plurality of shared rides over time

310

Match, by the processor, a second set of users to a second shared ride based on service profile data for the users, vehicle data for vehicles, and the response matrix so that the satisfaction of the second set of users with the second shared ride is improved based on the response matrix. In some embodiments, the request data for two or more users is also used to match users to a shared ride with one another. For example, the similarity in the routes from the starting points and the destinations of the rides requested by the request data is a factor considered by the ride system, in additional to the others, when matching users for a shared ride.

400
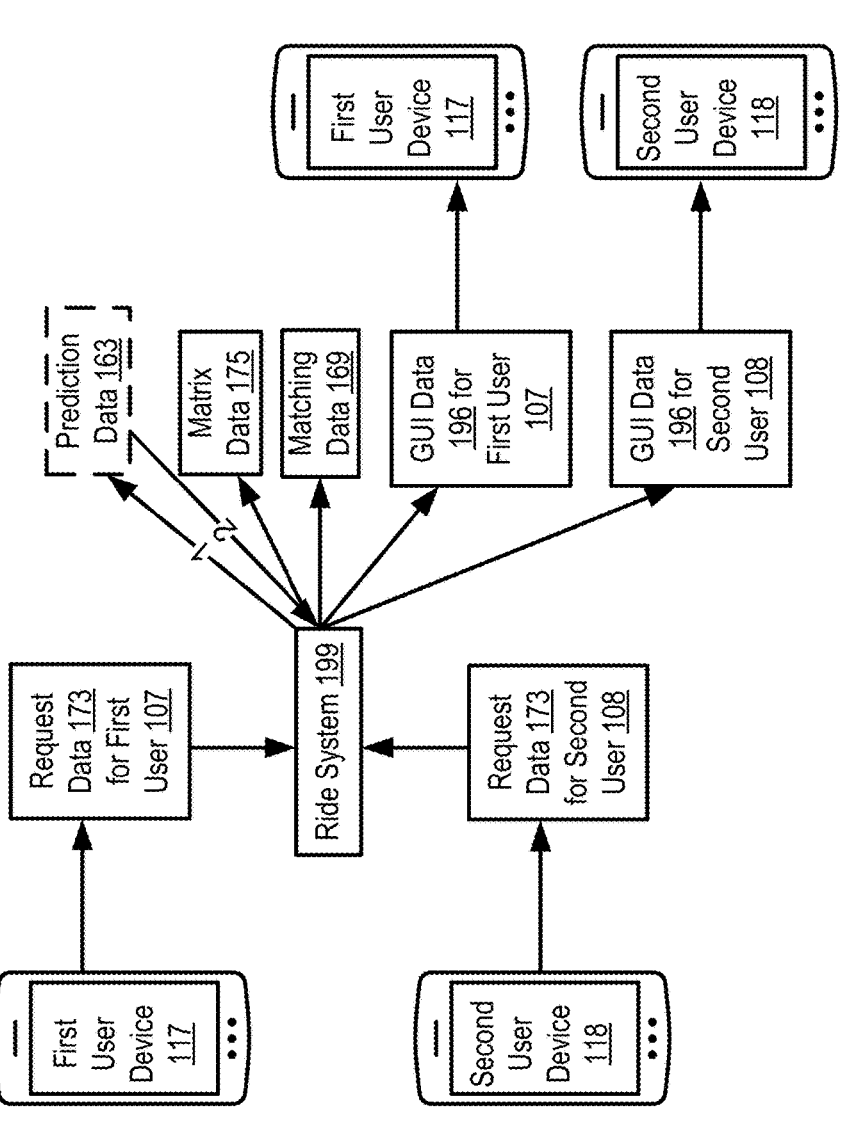
Figure 4

Example of User Profile Data 165

| Attributes Category | Attributes | X |
|---|---|---|
| User Attributes | Age | $x_1$ |
| | Gender | $x_2$ |
| | Population Group/Ethnicity | $x_3$ |
| | Income Level | $x_4$ |
| | Education Level | $x_5$ |
| | Zip Code | $x_6$ |
| | Tech Savviness | $x_7$ |
| | Vehicle Ownership | $x_8$ |
| | Ride Service Usage Frequency | $x_9$ |
| | Handicap and Impairments | $x_{10}$ |
| | ... | $x_{n1}$ |
| Pairing User Attributes | Age | $x_{n1+1}$ |
| | Gender | $x_{n1+2}$ |
| | Population Group | $x_{n1+3}$ |
| | Income Level | $x_{n1+4}$ |
| | Education Level | $x_{n1+5}$ |
| | ... | $x_{n2}$ |
| Trip Features | Purpose | $x_{n2+1}$ |
| | Time of the Day | $x_{n2+2}$ |
| | Day of the Week | $x_{n2+3}$ |
| | Traffic Conditions | $x_{n2+4}$ |
| | Traveling Distance | $x_{n2+5}$ |
| | Cost | $x_{n2+6}$ |
| | ... | $x_n$ |

Figure 5

Example of Service Profile Data 128

| Attribute Category | Attribute | Attribute Value/Condition | Service Reference Code |
|---|---|---|---|
| Match Attributes | Age | Age Group 1 | $R_1$ |
| | | Age Group 2 | $R_2$ |
| | | Age Group 2 | $R_3$ |
| | Gender | Same | $R_4$ |
| | | Different | $R_5$ |
| | Zip Code | Local | $R_6$ |
| | | Non-local | $R_7$ |
| | Education | Equal Level | $R_8$ |
| | | Higher Level | $R_9$ |
| | | Lower Level | $R_{10}$ |
| | | | $R_{m1}$ |
| Shared Motivators | Cost Saving (%) | Cost Tier 1 | $R_{m1+1}$ |
| | | Cost Tier 2 | $R_{m1+2}$ |
| | | Cost Tier 3 | $R_{m1+3}$ |
| | | Cost Tier 4 | $R_{m1+4}$ |
| | Arrival Delay | < Val 1 | $R_{m1+5}$ |
| | | < Val 2 | $R_{m1+6}$ |
| | Pollutant Reduction | Reduction Val | $R_{m1+7}$ |
| | | | $R_{m2}$ |
| Shared Accommodation | Independent Cabins | Yes | $R_{m2+1}$ |
| | Vehicle Style | Style 1 | $R_{m2+2}$ |
| | | Style 2 | $R_{m2+3}$ |
| | | Style 3 | $R_{m2+4}$ |
| | Entertainment Features | Yes | $R_{m2+5}$ |
| | | | $R_{m3}$ |
| Marketing Attributes | 2nd Shared ride free | Yes | $R_{m3+1}$ |
| | MoD tech education video | Yes | $R_{m3+2}$ |
| | | | $R_m$ |

Figure 6

PERSONALIZING A SHARED RIDE IN A MOBILITY-ON-DEMAND SERVICE

BACKGROUND

The specification relates to personalizing a shared ride in a mobility-on-demand (MoD) service.

Taxis and other transportation services have been disrupted by MoD services. A MoD service includes a service in which users plan, book, and pay for a mobility service (e.g., a ride or a journey from one point to another point). The MoD concept anticipates a shift away from personally owned modes of transportation and towards mobility provided as a service. This is enabled by providing users with a unified gateway that creates and manages the trip, which users can pay for with a single account. The gateway is usually provided via an electronic interface, though this is not strictly necessary. Examples of an electronic interface include a smartphone application, smartwatch application, tablet application, or some other electronic interface. Users can pay per trip or a monthly fee for a limited distance. A concept of MoD is to offer travelers mobility solutions based on their travel needs.

Travel planning using MoD services typically begin in a journey planner. The journey planner is usually a generic graphical user interface (GUI). For example, a journey planner can show that the user can get from a starting point to another point (a "destination") by taking a ride in a vehicle. The user can then choose their preferred trip. At that point, any necessary bookings are scheduled by the MoD service.

Presently the vehicles which are used to provide a MoD service to a user are operated by a driver, but in the future, it is expected that these vehicles will be autonomous. Sometimes Modern vehicles broadcast V2X messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." Other types of vehicle control systems are possible. A vehicle control system includes code and routines, and optionally hardware, that are operable to control the operation of some or all of the systems of a vehicle.

A particular vehicle that includes these vehicle applications is referred to herein as an "ego vehicle" and other vehicles in the vicinity of the ego vehicle are referred to as "remote connected vehicles."

SUMMARY

A problem is that rides provided by MoD services are blamed for increased traffic congestion and pollution. Shared rides are a solution to this problem. A shared ride is a MoD service whereby two different users share the same vehicle to complete different journeys. For example, a first user requests a first ride from an MoD service from a first starting point to a first destination using an ego vehicle. A second user requests a second ride from the MoD service from a second starting point to a second destination using the ego vehicle. For at least a portion of the first ride and the second ride, the first user and the second user are in the same ego vehicle at the same time. The first starting point and the second starting point may be the same or different. The first destination and the second destination may be the same or different. The first user and the second user may or may not know one another. The first user pays for the first ride and the second user pays for the second ride. This example includes just two users, however, in practice a shared ride may include more than two users. Sometimes a shared ride is referred to as a "pooled ride."

In general, there are two different types of shared rides: (1) one-origin-multiple-destination trips; and (2) multiple-origin-multiple-destination trips.

A one-origin-multiple-destination trip is a trip in which multiple passengers are picked up by a common vehicle at a common starting point and then taken by the common vehicle to different destinations. Examples of common starting points include an airport, a train station, a sporting event, a bar, a nightclub, etc. For example, a single vehicle picks up multiple passengers at an airport and takes them to multiple destinations.

A multiple-origin-multiple-destination trip is a trip in which multiple passengers are picked up by a common vehicle at a multiple different starting points and then taken by the common vehicle to different destinations. For example, a single vehicle picks up three passengers: one from a house; one from a bar; and one from a grocery store. This single vehicle then takes these three passengers to three different destinations. At some point in time at least one of the passengers is in the same vehicle at the same time with at least one of the other passengers.

A problem with shared rides is that many users are not interested in sharing a ride with other users. This can be for any number of reasons. For example, some users dislike sharing space with strangers or people in general. As another example, shared rides also require one or more users to wait while one or more other users complete their rides, and some users do not like waiting this extra time and/or the extra distance traveled.

The current solutions to this problem focus on implementing optimization algorithms that seek to make shared rides by: (1) minimizing delays experienced by users when waiting on other users to complete their rides; and (2) minimizing the distances traveled by the other users while other rides are being completed. The current solutions may display a graphical user interface (GUI) to prospective users explaining the cost savings of a shared ride in combination with other information relating to the expected delay and distance traveled. These current solutions ignore other attributes of the service which might make a shared ride more attractive to prospective users. These current solutions also focus on one-origin-multiple-destination trip and mostly ignore multiple-origin-multiple-destination trips.

Described herein are embodiments of a ride system which provides a MoD service to users which overcomes the deficiencies of the current solutions as described above. In some embodiments, the ride system is operable to provide a MoD service to users which matches users for a shared ride based on a rich set of attributes which increases the likelihood that the users will have a positive experience while using a shared ride provided by the MoD service. In some embodiments, the ride system is tailored to provide this shared ride experience for multiple-origin-multiple-destination trips which are ignored by the current solutions. Embodiments of the ride system are now described.

One type of V2X message is a Vehicle-to-Vehicle (V2V) message. Multiple classes of wireless V2V messages are being standardized in the United States and Europe. Some of the V2V messages allow for a higher level of cooperation (and conflict avoidance) between vehicles. Examples of such standardized V2V messages include cellular-V2X (C-V2X) messages. Some of these V2X messages include rich data sets describing the roadway environment, and therefore allow for a higher level of situational awareness about the roadway environment. A V2X message that includes a rich data set is described in some embodiments as a Basic Safety Message (BSM). In some embodiments, BSMs are transmitted via C-V2X. These V2X messages offer benefits in cooperation and awareness for road users. BSMs include a payload that includes the sensor measurements, among other information. The payload includes V2X data (see, e.g., the V2X data 133 depicted in FIG. 1).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for providing a mobility-on-demand service. The method includes receiving feedback from a first set of users that share a first shared ride, where the feedback describes their individual satisfaction with the first shared ride; updating, by a processor, a response matrix to include the feedback, where the response matrix includes digital data describing historical user satisfaction with a plurality of shared rides over time; and matching, by the processor, a second set of users to a second shared ride based on service profile data for the users, vehicle data for vehicles, and the response matrix so that the satisfaction of the second set of users with the second shared ride is improved based on the response matrix. Other embodiments of this aspect include corresponding computer systems, apparatus, and computer programs recorded on one or more computer storage devices, each configured to perform the actions of the methods. Implementations may include one or more of the following features. The method where one or more of the first shared ride, the plurality of shared rides, and the second shared ride are a multiple-origin-multiple-destination trip. Each of the first shared ride, the plurality of shared rides, and the second shared ride are multiple-origin-multiple-destination trips. The method is executed by a processor of a hardware server. The response matrix includes interpolated responses which are inferred by the processor. The response matrix includes interpolated responses which are inferred by the processor based on a set of digital twin simulations. The method is executed by an onboard vehicle computer of a vehicle. The method is executed by onboard vehicle computers of one or more vehicles that are members of a vehicular micro cloud. The vehicular micro cloud does not include a server as a member of the vehicular micro cloud. One or more of the vehicles which provide the trips is an autonomous vehicle. Implementations of the described techniques may include hardware, a method or process, or computer software on a computer-accessible medium.

One general aspect includes a system that includes a non-transitory memory; and a processor communicatively coupled to the non-transitory memory, where the non-transitory memory stores computer readable code that is operable, when executed by the processor, to cause the processor to execute steps including: receiving feedback from a first set of users that share a first shared ride, where the feedback describes their individual satisfaction with the first shared ride; updating, by the processor, a response matrix to include the feedback, where the response matrix includes digital data describing historical user satisfaction with a plurality of shared rides over time; and matching, by the processor, a second set of users to a second shared ride based on service profile data for the users, vehicle data for vehicles, and the response matrix so that the satisfaction of the second set of users with the second shared ride is improved based on the response matrix. Other embodiments of this aspect include corresponding computer systems, apparatus, and computer programs recorded on one or more computer storage devices, each configured to perform the actions of the methods.

Implementations may include one or more of the following features. The system where one or more of the first shared ride, the plurality of shared rides, and the second shared ride are a multiple-origin-multiple-destination trip. Each of the first shared ride, the plurality of shared rides, and the second shared ride are multiple-origin-multiple-destination trips. The steps are executed by a processor of a hardware server. The response matrix includes interpolated responses which are inferred by the processor. The response matrix includes interpolated responses which are inferred by the processor based on a set of digital twin simulations. The steps are executed by an onboard vehicle computer of a vehicle which includes the processor. The steps are executed by onboard vehicle computers of one or more vehicles that are members of a vehicular micro cloud. The vehicular micro cloud does not include a server as a member of the vehicular micro cloud. Implementations of the described techniques may include hardware, a method or process, or computer software on a computer-accessible medium.

One general aspect includes a computer program product including computer code stored on a non-transitory memory that is operable, when executed by a processor, to cause the processor to execute operations that include: receive feedback from a first set of users that share a first shared ride, where the feedback describes their individual satisfaction with the first shared ride; update a response matrix to include the feedback, wherein the response matrix includes digital data describing historical user satisfaction with a plurality of shared rides over time; and match a second set of users to a second shared ride based on service profile data for the users, vehicle data for vehicles, and the response matrix so that the satisfaction of the second set of users with the second shared ride is improved based on the response matrix. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 is a flowchart of an example method for providing a MoD ride service to provide a shared ride according to some embodiments.

FIG. 4 is a block diagram of an example process flow for providing a MoD ride service to provide a shared ride according to some embodiments.

FIG. 5 is a block diagram of an example of a user profile according to some embodiments.

FIG. 6 is a block diagram of a service profile according to some embodiments.

DETAILED DESCRIPTION

Described herein are embodiments of a ride system. The functionality of the ride system is now introduced according to some embodiments.

In some embodiments, the ride system includes code and routines that are operable, when executed by a processor, to cause the processor to provide a MoD service that includes shared rides to a set of users, determine the level of user satisfaction with a set of shared rides which are configured by the ride system to include various incentives based on the user profiles for the users (e.g., in this way the ride system may test which incentives produce positive responses in different users), update a response matrix based on the determined level of user satisfaction with the shared rides and the incentives which produced these levels of satisfaction (e.g., in this way the ride system may update the matrix with feedback from users that describes their level of satisfaction with the shared rides they experienced), and match sets of users and vehicles (and, optionally, drivers of the vehicles) to subsequent shared rides based on the satisfaction information which is stored in the response matrix.

In some embodiments, the ride system includes an end-to-end system to enable multiple-origins-multiple-destinations trips which are personalized to different users and optimized by the ride system to maximize user satisfaction with their shared rides.

Figure 7:
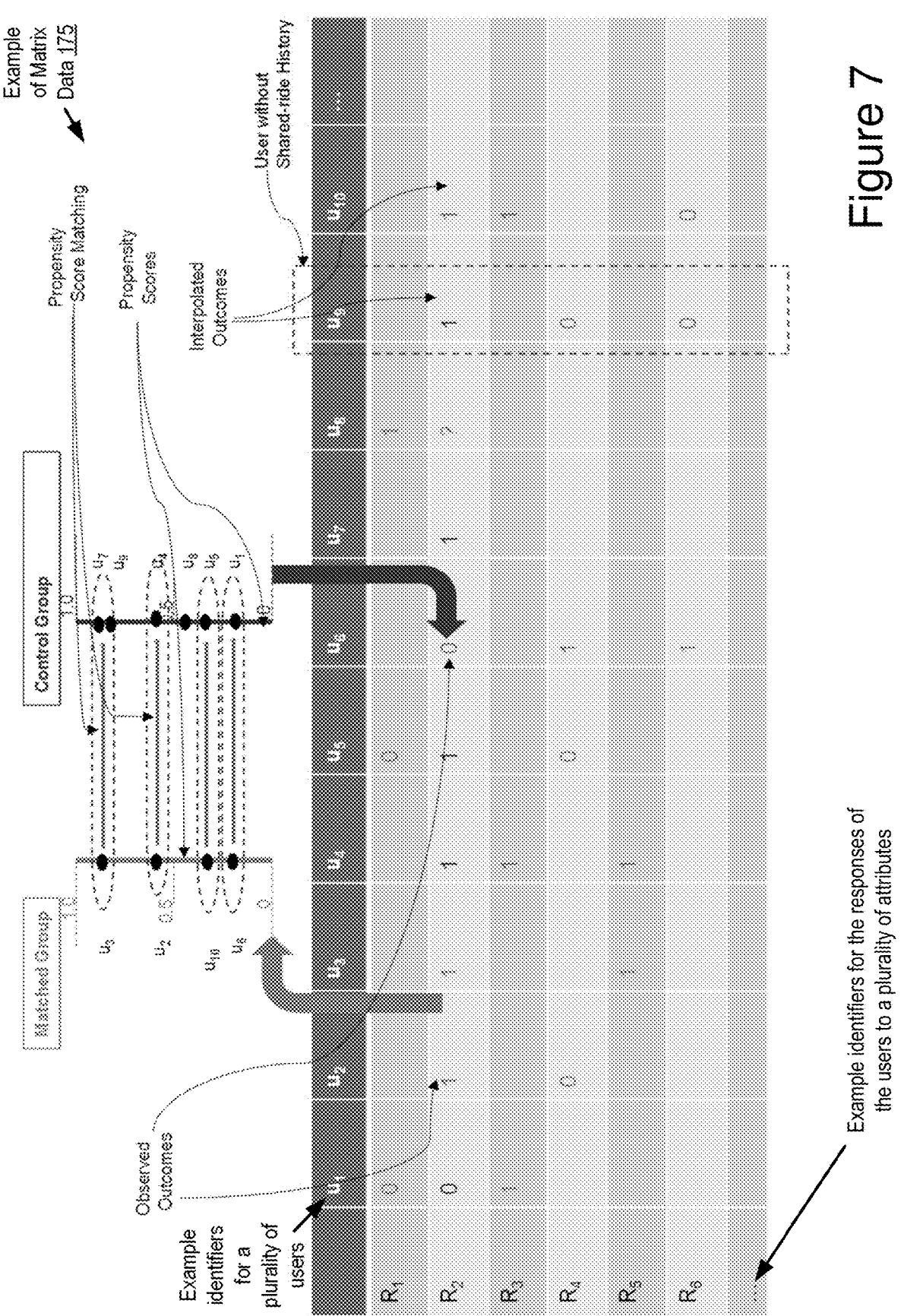
FIG. 7 is a block diagram of an example of a response matrix, including interpolated responses of some of the users, for matching a plurality of the users for a shared ride according to some embodiments.

In some embodiments, the ride system includes code and routines that are operable, when executed by a processor, to cause the processor to execute a process for personalized matching of users and ride pairing orchestration that leverages the response matrix described herein. Existing solutions do not include a similar response matrix. An example of the response matrix according to some embodiments is depicted in FIG. 7. Response matrix data includes digital data that describes a response matrix including service profile data for a plurality of users of the MoD service provided by the ride system. An example of the response matrix data according to some embodiments includes the matrix data 175 depicted in FIG. 1.

In some embodiments, the response matrix includes an aggregation of the service profile data for a plurality of users. Service profile data includes digital data that describes the service profile for a user of the MoD service. In some embodiments, each user of the MoD service includes their own instance of service profile data in the digital data accessible by the ride system so that the ride system can personalize the matching of users for shared rides for each user based at least in part on their service profiles of the users as well as attributes of the particular trip which is being taken at any given time. An example of the service profile data according to some embodiments includes the service profile data 128 depicted in FIG. 1.

A single instance of service profile data for a single user includes the following digital data which collectively make up the service profile for this particular user: user profile data describing information about the particular user; and response information describing how the particular user responds to different attributes (also referred to herein as "incentives"). An example of user profile data is depicted in FIG. 5.

An example of service profile data is depicted in FIG. 6. Referring to FIG. 6, the right-most column of the example of the service profile data depicted is labeled "System Response (R)." The responses in this right-most column are examples of the response information according to some embodiments of the ride system. Also referring to FIG. 6, the second left-most column of the example of the service profile data depicted in FIG. 6 is labeled "Attributes." The attributes depicted in this second left-most column are examples or attributes (which are also referred to herein as "incentives") which are available to a user during a shared ride according to some embodiments of the ride system. Additional and/or different attributes are possible.

As previously described, the response matrix includes aggregated service profile data for a plurality of users of the MoD service provided by the ride system. Matrix data includes digital data that describes the response matrix. An example of the matrix data according to some embodiments includes the matrix data 175 depicted in FIG. 1.

An example of a response matrix according to some embodiments is depicted in FIG. 7. As depicted, the response matrix includes the following from the service profiles of a plurality of users: (1) an identifier for a plurality of users (see, e.g., the identifiers $u_1, u_2, u_3 \ldots u_{10} \ldots$ for a plurality of users which are described in the top row of the matrix); (2) the identifiers for a plurality of responses to different distinct attributes (see, e.g., the identifiers $R_1, R_2, R_3 \ldots R_6 \ldots$ for a plurality of responses of the plurality of users (those identified by $u_1, u_2, u_3 \ldots u_{10} \ldots$) to a plurality of attributes/incentives (which are identified by the identifiers $R_1, R_2, R_3 \ldots R_6 \ldots$), corresponding examples of which are described in FIG. 6); (3) digital data describing how the users, which are identified by $u_1, u_2, u_3 \ldots u_{10} \ldots$, responded to the attributes are identified by the identifiers $R_1, R_2, R_3 \ldots R_6 \ldots$ (e.g., a "1" indicates a positive response and an "0" indicates a negative response); and (4) prediction data describing the predicted responses of the users, which are identified by $u_1, u_2, u_3 \ldots u_{10} \ldots$, would respond to a particular attribute if they experienced a shared ride having that particular attribute (e.g., the column labeled $u_9$ includes examples of interpolated responses of the user indicated by the identifier $u_9$, which is an example of prediction data according to some embodiments). The prediction data is described in more detail below.

In some embodiments, the response matrix includes different and/or additional digital data. For example, in some embodiments the response matrix includes digital data describing one or more of the following: (1) the user profiles for a plurality of users of the MoD service provided by the ride system (or a subset of the information included in the user profiles for these users, such as their responses to different incentives available for taking a shared ride using the MoD service, as depicted in the example of FIG. 7); (2)

the vehicle profiles for a plurality of the vehicles which provide the shared rides of the MoD service (or a subset of the information included in the vehicle profiles for these vehicles, such as independent cabins, vehicle style, entertainment features, fuel efficiency; presence of an electric or hybrid drive train, other environmental impacts of the vehicle, etc.; this is not depicted herein by included in some embodiments of the ride system); and (3) the driver profiles of the drivers who operate any non-autonomous vehicles which are described by the vehicle profiles (or a subset of the information included in the driver profiles for these drivers, such as their age, gender, education, etc.; this is not depicted herein by included in some embodiments of the ride system). These profiles are described in more detail below according to some embodiments.

User Profiles

A user profile includes a description of a user and a list of incentives (sometimes referred to herein as the "attributes" of a shared ride) available for a shared ride and how the user responds or is predicted by the ride system to respond to the incentives included in the list. The predicted responses to the incentives are determined by the ride system based on one or more of the following: interpolation based on the user profiles for a plurality of users (an example of which is depicted in FIG. 7 according to some embodiments); deep learning based on the user profiles for a plurality users using a deep learning algorithm included in the ride system; digital twin simulation using simulation software included in the ride system; and any other analysis for determining such predictions. Prediction data includes digital data that describes the predicted responses of the users. An example of prediction data according to some embodiments includes the prediction data 163 depicted in FIG. 1. The prediction data is beneficial, for example, if the ride system does not have access to user profile data and/or feedback data indicating the response of a particular user to a particular type of attribute/incentive. For example, the ride system uses the prediction data to fill in the response matrix in situations where the response of a particular user (e.g., the user indicated by the identifier $u_9$ in FIG. 7) will respond to a particular type of attribute.

User profile data includes digital data that describes the user profile for a user or a set of users. An example of the user profile data according to some embodiments includes the user profile data 165 depicted in FIG. 1. FIG. 5 depicts an example of user profile data describing a user profile for a particular user according to some embodiments. In some embodiments, the user profile is expressly (or directly) inputted by a user to the ride system using a GUI or some other input means so that the user can specify one or more of the following: information about themselves (see, e.g., the "user attributes" depicted in FIG. 5); information about their preferences for the other users they would be paired with by the ride system for a shared ride (see, e.g., the "pairing user attributes" depicted in FIG. 5); and information about the types of shared rides they take in general or information about a particular shared ride they are currently requesting to take (see, e.g., the "trip features" depicted in FIG. 5).

In some embodiments, the user completes a shared ride and is presented by the ride system with a GUI via their user device (e.g., a smartphone) for inputting their feedback about whether they enjoyed their most recent trip. The user can use this GUI to provide feedback data to the ride system. The feedback data includes digital data indicating whether the user enjoyed different attributes of a shared ride. In some embodiments, this feedback includes granular feedback information for one or more of the attributes and/or incentives. For example, for a given attribute within a ride, the granular feedback information specifies one of the following: they very much enjoyed it; they enjoyed it a normal amount; they somewhat enjoyed it; they did not enjoy it; they very much did not enjoy it, etc. Other types or schemes of granular feedback information are possible. The ride system receives the feedback data (as well as any granular feedback information included therein) and uses the feedback data to modify the user profile data for the user. In this way, the feedback data provides a feedback loop that beneficially enables the ride system to improve the ride experience of users for shared rides over time. An example of the feedback data according to some embodiments includes the feedback data 134 depicted in FIG. 1.

In some embodiments, a user profile and/or service profile of a first user specifies aspects of a second user's user profile which are preferred and/or unpreferred by the first user. For example, the user profile specifies that the first user prefers to only share rides with other users of the same gender. The user profile and/or service profile of a first user can specify any aspect of one or more second user profiles that are preferred and/or unpreferred by the first user. Such specifications of what is preferred and/or unpreferred by the first user is an example of response information which is included in one or more of the user profile data of the first user and the service profile of the first user. In this way, the user profiles of first and second users are used to match users to one another for a shared ride. The user profile of a first user may also specify a maximum and/or a minimum number of second users the first user prefers to be included in a shared ride.

Vehicle Profile

Vehicle profile data includes digital data that describes the vehicle profile for a vehicle which provides shared rides to the users of the MoD service provided by the ride system. An example of the vehicle profile data according to some embodiments includes the vehicle profile data 164 depicted in FIG. 1. The vehicle profile data describes a vehicle profile for a vehicle that provides shared rides to the users of the MoD service provided by the ride system 199. An example a vehicle described by the vehicle profile includes the ego vehicle 123 depicted in FIG. 1. In some embodiments, the driver of the vehicle (e.g., the driver 109 depicted in FIG. 1) uses their smartphone or some other electronic device to input the information included in the vehicle profile to the ride system 199 using a GUI or some other interface.

In some embodiments, the vehicle profile for a particular vehicle describes one or more of the following: the make of the vehicle; the model of the vehicle; the manufacturer of the vehicle; the driver of the vehicle; the safety features of the vehicle; whether the vehicle is an autonomous vehicle; the ADAS systems installed in the vehicle; the degree of automaticity of the vehicle (e.g., National Highway Traffic Safety Administration level number for the degree of automaticity of the vehicle such as, for example, Level III or higher or Level IIII or lower); whether the vehicle includes independent cabins for multiple passengers/users of a shared ride provided by the ride system; the style of the vehicle (e.g., sedan, coupe, truck, sports utility vehicle, luxury model, compact model); the trunk size of the vehicle; the number of bags accommodated by the vehicle; the number of passengers accommodated by the vehicle; the entertainment features provided by the vehicle; the fuel efficiency of the vehicle; whether the vehicle includes an electric drive train; whether the vehicle includes a hybrid drive train; whether the vehicle includes only a fossil fuel-dependent drive train; and any other environmental impacts of the vehicle, etc. This list is illustrative and not limiting of the attributes of a vehicle that may be described by the vehicle profile data.

In some embodiments, a user profile and/or service profile of a first user specifies aspects of a vehicle profile which are preferred and/or unpreferred by the first user. For example, the user profile specifies the types of ADAS systems that a first user prefers in the vehicles they occupy when taking a shared ride. The user profile and/or service profile of a first user can specify any aspect of the vehicle profile that is preferred and/or unpreferred by the first user. Such specifications of what is preferred and/or unpreferred by the first user is an example of response information which is included in one or more of the user profile data of the first user and the service profile of the first user. In this way, the vehicle profile is used to match users to specific vehicles for a shared ride.

Driver Profile

Driver profile data includes digital data that describes the driver profile for a driver that operates a vehicle which is used to provide shared rides to the users of the MoD service provided by the ride system. An example of the driver profile data according to some embodiments includes the driver profile data 168 depicted in FIG. 1. In some embodiments, the driver profile data is an element of the vehicle profile data for the vehicle which the driver operates. An example of such a driver includes the driver 109 depicted in FIG. 1. The driver 109 is a human operator of the ego vehicle 123 in embodiments where the ego vehicle 123 is not fully autonomous. The information described by the driver profile is similar to that described by the user profile and depicted in FIGS. 5 and 6 (e.g., age, gender, population group, etc.).

In some embodiments, a user profile and/or the service profile of a first user specifies aspects of a driver profile which are preferred and/or unpreferred by the first user. For example, the user profile specifies that the first user prefers to participate in rides with drivers that are the same gender as the first user. The user profile and/or the service profile of a first user can specify any aspect of a driver's profile that are preferred and/or unpreferred by the first user. Such specifications of what is preferred and/or unpreferred by the first user is an example of response information which is included in one or more of the user profile data of the first user and the service profile of the first user. In this way, the user profiles are used to match users to drivers for a shared ride.

Sensor Data

Vehicles include onboard sensors that constantly record sensor data describing their external environment. Vehicles transmit V2X messages to one another. The sensor data includes digital data describing the sensor measurements recorded by the onboard sensors (e.g., the sensor set). These V2X messages include V2X data in their payload. The V2X data includes, among other things, the sensor data they record. Vehicles that receive these V2X messages use this V2X data to improve their awareness of their environment. For vehicles that include Advanced Driver Assistance Systems (ADAS systems) or autonomous driving systems, the V2X data is inputted to these systems so that they can better understand their driving environment when providing their functionality.

An example of one specific type of sensor data includes GPS data. "GPS" refers to "geographic positioning system." The GPS data includes digital data that describes the geographic location of an object such as a vehicle or a smartphone. An example of GPS data according to some embodiments includes the GPS data 167 depicted in FIG. 1.

Figure 1:
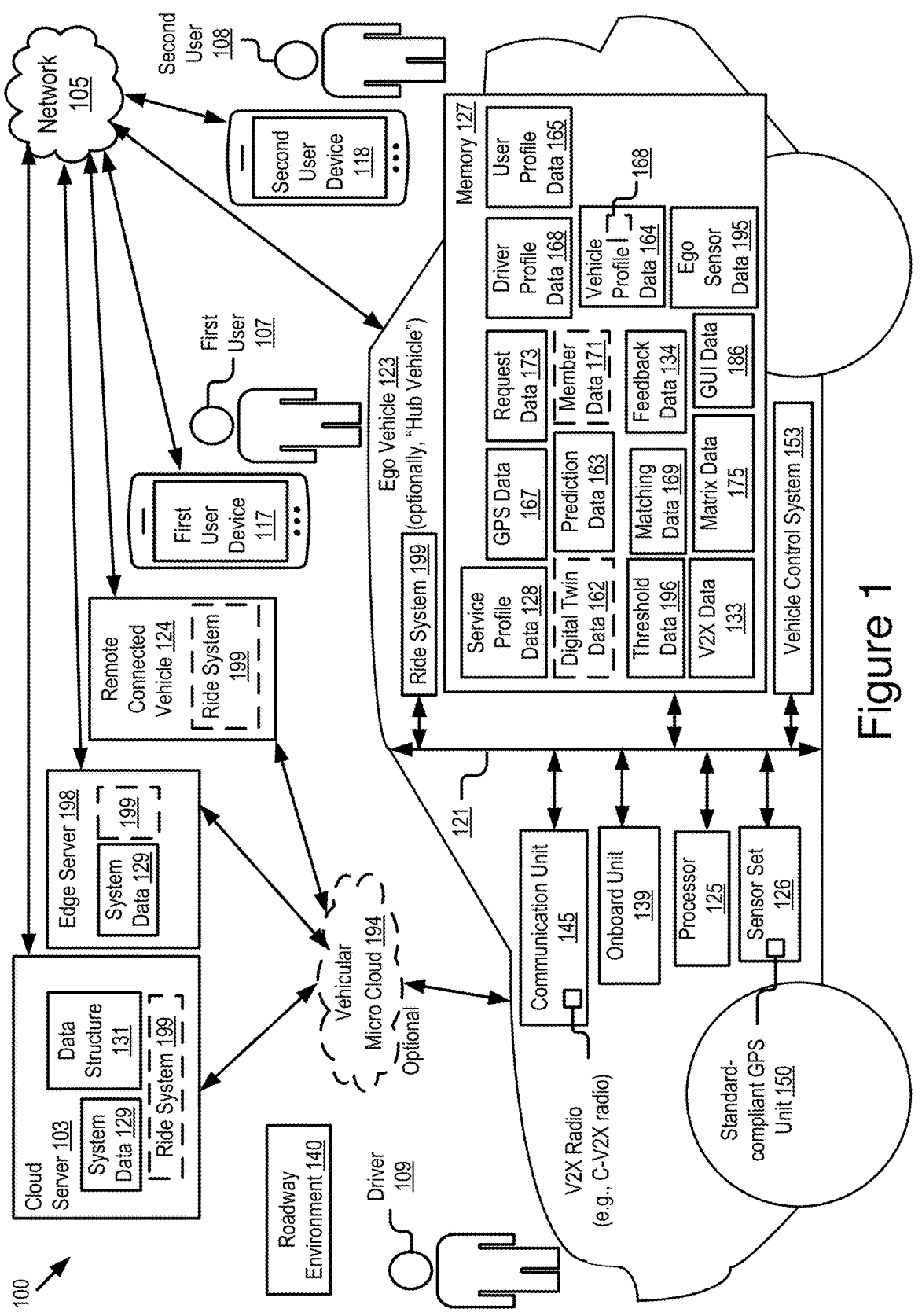
FIG. 1 is a block diagram illustrating an operating environment for a ride system according to some embodiments.

An example of the V2X data according to some embodiments includes the V2X data 133 depicted in FIG. 1. An example of the sensor data according to some embodiments includes the ego sensor data 195 depicted in FIG. 1.

A vehicle control system is an onboard system of a vehicle that controls the operation of a functionality of the vehicle. ADAS systems and autonomous driving systems are examples of vehicle control systems. Examples of the vehicle control system according to some embodiments includes the vehicle control system 153 depicted in FIG. 1.

Example General Method

In some embodiments, the ride system includes code and routines that are operable, when executed by a processor, to cause the processor to execute one or more steps of an example general method. The ride system may be an element of an ego vehicle, a remote connected vehicle, a cloud server, or an edge server installed in a roadway device such as a roadside unit (RSU). As described, the ride system is an element of a cloud server, but this description is not intended to be limiting.

In some embodiments, these steps are executed by a processor or onboard vehicle computer of an ego vehicle. The ego vehicle is a connected vehicle. A connected vehicle is a vehicle that includes a communication unit. An example of a communication unit includes the communication unit 145 depicted in FIG. 1. The remote connected vehicle is also a connected vehicle, and so, it includes a communication unit.

As used herein, the term "wireless message" refers to a V2X message transmitted by a communication unit of a connected vehicle such as a remote connected vehicle or the ego vehicle.

An example of the example general method is now described. In some embodiments, one or more steps of the example general method are skipped. The steps of the example general method may be executed in any order, and not necessarily the order presented. In some embodiments, a plurality of vehicles on a roadway include instances of the ride system and the ride systems of these vehicles also execute some or all of the steps described below. The steps of the example general method are now described according to some embodiments.

Step 1: A driver creates a driver profile for themselves. The driver profile data includes digital data that describes the driver profile for a driver. The driver profile data is stored in a non-transitory memory. For example, the driver profile data is stored in a data structure of a cloud server (and/or the edge server).

A data structure includes a non-transitory memory that organizes a set of data such as the system data. An example of the data structure according to some embodiments includes the data structure 131 depicted in FIG. 1. The system data includes some or all of the digital data described herein. An example of the system data according to some embodiments includes the system data 129 depicted in FIG. 1.

The cloud server includes a hardware server. An example of the cloud server includes the cloud server 103 depicted in FIG. 1.

In some embodiments, the data structure is an element of an edge server. An example of the edge server according to some embodiments includes the edge server 198 depicted in FIG. 1. An edge server includes a hardware server. In some embodiments, the edge server is an element of a roadside device such as a roadside unit.

An example of the driver profile data according to some embodiments includes the driver profile data 168 depicted in FIG. 1.

Step 2: A driver creates a vehicle profile for their vehicle. The vehicle profile data includes digital data that describes the vehicle profile for a vehicle. The vehicle profile data is stored in a non-transitory memory such as that which stores the driver profile. In some embodiments, the driver profile is an element of the vehicle profile or vice versa.

In some embodiments, steps 1 and 2 are completed for a plurality of vehicles. Step 1 is optional for embodiments where the vehicle is a fully autonomous vehicle (e.g., NHTSA Level III or higher).

In some embodiments, a vehicle includes a communication unit such as that described below for FIG. 1. The vehicle is one described by a vehicle profile stored in the data structure of the ride system. The vehicle includes a global positioning system (GPS system). The GPS system generates GPS data describing the geographic location of the vehicle. The GPS system determines GPS data for the vehicle at different times; optionally, this is done on a routine basis. The communication unit of the vehicle transmits a V2X message to the network including the GPS data in the payload of the V2X message (e.g., within the V2X data). The network relays the V2X message to the electronic computing device that hosts the ride system (e.g., the cloud server, the edge server, etc.). The ride system associates the GPS data for the vehicle with the vehicle profile data for the vehicle (and optionally the driver profile data for the vehicle as well). In some embodiments, each vehicle registered with the ride system (e.g., those vehicles that are described by the vehicle profile data stored in the data structure of the ride system) generate such GPS data at regular intervals and routinely transmit V2X messages providing their GPS data to the ride system. In this way the ride system has access to digital information that describes the location of vehicles which are registered with the ride system and available to provide rides to users that are registered with the ride system (e.g., those users that are described by the service profile data stored in the data structure of the ride system). The processor of vehicles providing their GPS data is described in more detail below, including below at step 9 of this example general method.

Step 3: A first user creates a service profile for themselves. The service profile data includes digital data that describes the service profile for the first user. The service profile data is stored in a non-transitory memory such as that which stores the other profiles described above. The service profile includes both the user profile for a user (e.g., the first user) and the response information for this user (e.g., how this user responds to different incentives/attributes). In some embodiments, the first user uses their smartphone or some other electronic processor-based computing device to input their user profile data and response information which are included in the service profile for the first user. An example of a suitable electronic processor-based computing device includes the first user device 117 or the second user device 118 depicted in FIG. 1. For example, the first user has a first user device which is, in this example, a smartphone. The smartphone includes a browser or application which causes a GUI to be displayed. The first user inputs service profile data describing their service profile to the ride system using the GUI. GUI data includes digital data that instructs an electronic processor-based computing device having an electronic display how to display a GUI on the electronic display and receive inputs via the electronic display or some other input device such as a keyboard or microphone. An example of the GUI data according to some embodiments includes the GUI data 186 depicted in FIG. 1.

The service profile data is uploaded to the ride system via a network such as the network 105 depicted in FIG. 1. The ride system is hosted by a processor-based computing device such as one or more of the cloud server, the edge server, or a vehicular micro cloud. The ride system receives the service profile data for the first user and stores it in the data structure (e.g., the data structure 131).

Step 3 is completed for a plurality of second users. The ride system receives the service profile data for the plurality of second users and stores the service profile data for the plurality of second users in the data structure along with the service profile data for the first user.

Step 4: The ride system analyzes the service profile data for the first users and the plurality of second users to build the matrix data. In some embodiments, the matrix data helps the ride system to correlate which of the users of the ride system (e.g., the first user and the plurality of second users) have similar response information for similar incentives and/or attributes of a shared ride. An example of matrix data is depicted in FIG. 7.

In some embodiments, step 4 is repeated periodically or at some interval to account for new users of the ride system or to update the matrix data based on feedback data which is received over time and/or prediction data which is generated over time. The feedback data, the prediction data, and examples of updating the matrix data according to some embodiments are described below.

In some embodiments, the matrix data is incomplete. For example, the matrix data does not include information describing how one or more of the users responds to one or more possible incentives or attributes.

In some embodiments, the ride system includes code and routines that are operable, when executed by a processor, to analyze the matrix data and predict, on a user-by-user and attribute-by-attribute basis, how a particular user would respond to a particular attribute. The output of this analysis and prediction is the prediction data. For example, the ride system generates prediction data and changes the user profile data for a user to include the prediction data for a particular attribute for which there was no response information. In this way the prediction data is a substitute for the response information.

An example of this substitution is depicted in FIG. 7. For example, in FIG. 7 the matrix data does not include and response information from the user $u_9$ for the attribute whose responses are identified by the identifier $R_2$. The ride system generates prediction data that describes the predicted response of the he user $u_9$ for the attribute whose responses are identified by the identifier $R_2$.

The ride system includes code and routines that are operable, when executed by a processor, to cause the processor to execute one or more strategies for generating prediction data. These include propensity score matching, interpolation, digital twin simulation, deep learning, and other related methods and/or derivatives or combinations of these methods. These examples are described blow under the heading labeled "Prediction Data" which is below this example general method.

Step 5: The ride system receives a set of request data from a plurality of users. The request data includes digital data describing information for a plurality of shared rides for the plurality of users. Ride data includes digital data that describes a request for a shared ride for a specific user (e.g., the first user or one of the second users). For a specific user, the request data for this user describes their starting point and their destination. The request data also includes a unique identifier of the specific user which is making the request for the shared ride; the ride system uses their unique identifier to retrieve the service profile data for this user (e.g., because the service profile data is indexed within the data structure based on such unique user identifiers) and/or identify the information for this specific user within the matrix data.

In some embodiments, the request data also specifies response information to a plurality of incentives or attributes for a shared ride. The response information may be general in nature or specific for this particular ride. For example, a user specifies that for this particular ride they are most concerned that their ride be completed as quickly as possible. Or the user specifies that in general they are most concerned with the ride being as environmentally conscious as possible with an emphasis on using electric vehicles, hybrid vehicles, or vehicle having a high fuel efficiency that meets some threshold (e.g., at least 40 miles per gallon). Any other type of response information may be entered.

In some embodiments, for some or all types of response information including that which is provided during creation of the service profile for the user, the user is able to input granular service profile information specifying how important the particular incentive and/or attribute is to them (e.g., especially important, important, somewhat important, less important, not important, etc.). For example, a user specifies that they prefer a driver having the same gender as them and that this attribute is especially important.

In some embodiments, the user is able to input information describing condition information for them granular service profile information. For example, a user specifies that they prefer a driver and other passengers having the same gender as them and that this attribute is especially important to them at night (e.g., after sunset) but not important to them at other times. As another example, a user specifies that they prefer riding in a vehicle that has a high fuel efficiency and that this attribute is important to them during rush hour (e.g., between 4:00 pm and 7:00 pm each weekday) but less important to them at other times of the day.

In some embodiments, the granular service profile information inputted by the user affects the subsequent GUIs that are presented to the user by the ride system. For example, the ride system uses the granular service profile information to customize or personalize the GUIs presented to the user so that these GUIs emphasize attributes or incentives that are most appealing to the user and/or market the MoD service to the user in a way that makes them happier with the MoD service or understand better how the MoD service meets or is meeting their preferences (or responds or is responding to their preferences) as indicated in the response information and/or the granular service profile information.

Step 6: The ride system analyzes the matrix data to identify a set of users having similar responses to similar incentives and attributes. This creates a set of "matched users." In some embodiments, a plurality of sets of matched users are generated or stored in the data structure. In some embodiments, this step 6 occurs at a different point in the method. Accordingly, this step 6 is illustrative of a single embodiment. Other embodiments are possible.

Step 7: The ride system analyzes the set of request data from the plurality of users received at step 5 and identifies a set of two or more users having starting points and destinations which overlap a sufficient amount to satisfy a threshold for matched shared rides. These users are referred to as "overlapping users." Threshold data includes digital data that describes this, or any other threshold described herein. An example of the threshold data according to some embodiments includes the threshold data 196 depicted in FIG. 1. An example of a threshold for a matched shared rides includes the ride having at least 50% overlap or any other number inputted by an administrator of the ride system. Other thresholds for a matched shared ride are possible.

In some embodiments, the threshold for a matched shared ride is about ensuring that the first user or the second user in the ride has a minimized amount of time waiting on other users' rides to be completed (e.g., 5 minutes or any other time inputted by the administrator), and if this amount of time is satisfied then the threshold for a matched shared rides is satisfied.

In some embodiments, the threshold for a matched shared ride 451 is specified in the response information or granular service profile information inputted by a user so that the ride system allows the user to have control over this threshold so that the shared ride is more tailored to their preferences.

Step 8: From among the overlapping users, the ride system analyzes the set of matched users to determine if any of the overlapping users are also in the same set of matched users. Overlapping users are users that are logically matched because of their starting point and their destinations. Matched users are users that are logically matched because of their response information. In some embodiments, a set of users are eligible to share a ride with one another using the MoD service provided by the ride system when they are both: (1) "overlapping users" because of the analysis at step 7; and (2) "matched users" because of the analysis at step 6. Users which meet both of these requirements are referred to as "eligible users."

In some embodiments, some or all of the eligible users are designated by the ride system to participate in a shared ride. The ride system designates one of the starting points for one of the eligible users of the shared ride as the "first starting point" for the shared ride. The ride system designates one of the destinations for one of the eligible users as the "first destination" for the shared ride.

The first starting point and the first designation may not be mapped to the same user. For example, the first starting point may be the starting point for a first user while the first destination is the destination for a second user. The shared ride will then travel to different "second starting points" and different "second destinations" while completing a travel itinerary for the shared ride.

The travel itinerary for a shared ride includes one or more of the following: a first starting point; a first destination; a set of second starting points; and a set of second destinations.

In some embodiments, all of the users grouped by the ride system for a shared ride have the same starting point. In some embodiments, two or more of the users grouped by the ride system for a shared ride have different starting points. In some embodiments, all of the users grouped by the ride system for a shared ride have different destinations. In some embodiments, two or more of the users grouped by the ride system for a shared ride have different destinations.

In some embodiments, a multiple-origin-multiple-destination trip is a shared ride grouping created by the ride system where all of the users have different starting points (i.e., origins) and different destinations. In some embodiments, a one-origin-multiple-destination trip is a shared ride grouping where all of the users have the same starting point (i.e., origin) and different destinations.

In some embodiments, the ride system only provides multiple-origin-multiple-destination trips and step 8 is configured to account for this functionality. For example, when grouping a set of users together for a shared ride, the ride system considers the starting point of the users and ensures that only users having different starting points are grouped together for a shared ride. This is an optional feature; some existing solutions only focus on providing shared rides for one-origin-multiple-destination trips (e.g., those beginning at airports), and so, an emphasis on multiple-origin-multiple-destination trips is a benefit of the ride system according to some embodiments which is not provided by the existing solutions. In some embodiments, the ride system provides any type of shared ride and not just multiple-origin-multiple-destination trips.

Step 9: Vehicles which provide rides to the users of the ride system use V2X messages or other wireless messages to provide their GPS data to the ride system. As used here, the GPS data describes the geographic location of the vehicle which provides the GPS data to the ride system. In some embodiments, these vehicles continuously provide their GPS data to the ride system. The ride system receives the GPS data and adds it to the data structure. In some embodiments, the GPS data for a vehicle is an element of the matrix data along with (1) the vehicle profile data for the vehicle and (2) the driver profile data for the vehicle. In some embodiments, the driver profile data is not applicable for driverless fully autonomous vehicles in some embodiments. In some embodiments, this step is completed before "matched users" are identified by the ride system.

The request data provided by users also includes GPS data. For example, the starting point specified by the request data is specified by the GPS data describing the geographic location for this starting point (e.g., latitude and longitude). Similarly, the destination is specified by the GPS data describing this this destination. In this way, the ride system is able to calculate the relative location of vehicles to starting points for different users using the GPS data for the vehicles and the starting points. The ride system is also able to calculate the relative locations of the destinations for different ride requests and other types of relative locations which are beneficial for matching users to one another and vehicles to different combinations of users.

Step 10: The ride system analyzes the vehicle profile data (which may or may not be included in the matrix data) to identify a vehicle which is geographically proximate to the starting point for a set of matched users. For example, the ride system analyzes the GPS data describing the geographic locations of the registered vehicles which are available to provide a ride to the GPS data describing the first starting point of a set of matched users to identify vehicles which satisfy a distance threshold. Those vehicles which satisfy the distance threshold are determined by the ride system to be candidates to provide a shared ride to the set of matched users.

In some embodiments, the distance threshold describes a distances between the vehicle and the first starting point for a set of matched users. In some embodiments, this distance threshold must be satisfied for a vehicle to be candidates to provide a shared ride to a set of matched users. The distance threshold is configurable by an administrator of the ride system or a user of the ride system. The distance threshold is described by the threshold data.

Step 11: The ride system analyzes the vehicle profile data and/or the driver profile data for the candidate vehicles to identify a set of vehicles that are eligible to provide a shared ride to the set of matched users. The eligible vehicles are those from the candidate set of vehicles whose vehicle profile data and/or driver profile data satisfy the preferences and/or response information of the users included in the set of matched users. In this way the ride system uses the service profile data for a set of matched users, the vehicle profile data for a set of candidate vehicles, and, optionally, the driver profile data for a set of candidate vehicles, to cull the set of candidate vehicles to form a set of eligible vehicles that are eligible to provide a shared ride to a set of matched users.

For example, if a user included in the set of matched users does not want to drive with a male driver and a particular vehicle is operated by a male driver, then this vehicle is not an eligible vehicle. Similarly, if a vehicle is operated by a non-male driver then this vehicle is an eligible vehicle (assuming that there is only this one attribute being considered).

Step 12: The ride system analyzes the GPS data for the set of eligible vehicles and selects the closest vehicle as the vehicle which is matched to the set of matched users. The output of this step is the matching data. The matching data includes digital data that describes the set of matched users, vehicle, and, optionally, driver, which are matched by the ride system for a shared ride. An example of the matching data according to some embodiments includes the matching data 169 depicted in FIG. 1.

Step 13: The ride system provides GUI data to the electronic processor-based devices of the users and the driver (optionally) to inform them of the ride. In some embodiments, the GUI data for each human is personalized based on their response information so that their preferences and how the shared ride satisfy their references is highlighted or emphasized. See, e.g., FIG. 4.

Step 14: The vehicle specified by the matching data provides the shared ride to the matched users.

Step 15: The matched users provide feedback data for the ride. The feedback data includes digital data that describes a user's response information for one or more attributes and/or incentives within the shared ride they were provided at step 14. Each user provides their own feedback data using their own electronic processor-based computing device (e.g., the first user device 117 for the first users 107). The ride system receives the feedback data and updates the service profile data and the matrix data based on the feedback data.

Real-Time Updating of the Vehicle Profile Data

In some embodiments, the ride system provides real-time updates to the vehicle profile data based on the current conditions in the real-world. For example, a vehicle profile includes digital data, that is up to date based on current conditions, and describes one or more of the following: available seating capacity; available cargo capacity; features to assist the differently abled; special accommodation features such as passenger isolated compartments and cabins; fuel levels (e.g., a description of miles to be traveled before the fuel tank is empty); and cleanliness (e.g., a description of the cleanliness of the vehicle cabin).

In some embodiments, each vehicle registered with the ride system, or the user device of each driver that is registered with the ride system, includes software that provides a wireless message to the ride system that includes digital data that provides real-time updates for the vehicle profile data.

User Reassignment

In some embodiments, the ride system monitors each user's satisfaction with their shared ride as it is occurring and compares this satisfaction to a threshold. If the satisfaction level of a passenger fails to satisfy the threshold, the ride system takes a remedial action. The remedial action includes, for example, rematching and reassigning the user to a new shared ride.

Prediction Data

The ride system includes code and routines that are operable, when executed by a processor, to cause the processor to execute one or more strategies for generating prediction data. These strategies include one or more of the following: propensity score matching; interpolation; digital twin simulation; time series analysis; pattern recognition; deep learning algorithms which are included in the ride system; other strategies related to these; other strategies that are derivative of these; and any combination of these strategies. Propensity score matching and interpolation is described below with reference to FIGS. 4, 5, and 6. Digital twin simulations, time series analysis, pattern recognition analysis, and deep learning analysis are now briefly introduced.

In some embodiments, the ride system of the ego vehicle uses digital twin simulations to estimate how a particular user will respond to a particular incentive or attribute. For example, the user profile data for a first user inputted to a simulation software which executes one or more digital twin simulations based on this input; digital data for various other user profiles and/or service profiles for various second users, vehicle profiles for various vehicles, and driver profiles for various drivers of the various vehicles are also inputted to the simulation software in order to execute one or more digital twin simulations which are used to estimate how the first user responds to attributes of these variables (e.g., the second users, the vehicles, the drivers, the length of the ride, the length of their waiting times during the ride, etc.). In this way the digital twin simulations execute various simulations which attempt to estimate or predict how the first user will respond to different types of attributes and/or incentives. Digital twin data includes any digital data that is necessary to execute the digital twin simulations and output the prediction data that describes how the first user responded to different types of attributes and/or incentives during the digital twin simulations. The digital twin data also describes the output of these digital twin simulations (e.g., the digital twin data includes the prediction data in some embodiments). An example of the digital twin data according to some embodiments includes the digital twin data 162 depicted in FIG. 1. Digital twin simulations are described in more detail below.

In some embodiments, digital twin simulations beneficially enable the ride system to infer or interpolate patterns of behavior even when not enough data is available to satisfy a threshold for a pattern. For example, the ride system uses digital twin simulations to infer or interpolate prediction data when response information is not included in the user profile data or service profile data for a particular user.

In some embodiments, the ride system makes similar inferences or interpolation based on one or more of pattern recognition, time series analysis, and deep learning analysis. The ride system includes code and routines and any digital data necessary to execute the pattern recognition analysis, time series analysis, and/or deep learning analysis.

The pattern recognition data includes any digital data that is necessary for the ride system to perform the pattern recognition analysis using one or more of the following as inputs to a pattern recognition algorithm included in the ride system: the user profile data; the service profile data; the vehicle profile data; the driver profile data; and the matrix data. The pattern recognition data may include object priors or any other digital data that is necessary for this analysis. In some embodiments, the pattern recognition data is an element of the system data 129 and stored in the data structure 131.

The time series analysis data includes any digital data that is necessary for the ride system to perform the time series analysis using one or more of the following as inputs to a time series analysis algorithm included in the ride system: the user profile data; the service profile data; the vehicle profile data; the driver profile data; and the matrix data. In some embodiments, the time series analysis data is an element of the system data 129 and stored in the data structure 131.

The deep learning analysis data includes any digital data that is necessary for the ride system to perform the deep learning analysis using one or more of the following as inputs to a deep learning algorithm included in the ride system: the user profile data; the service profile data; the vehicle profile data; the driver profile data; and the matrix data. In some embodiments, the deep learning analysis data is an element of the system data 129 and stored in the data structure 131.

Vehicular Micro Clouds

Vehicular micro clouds are an optional feature of some of the embodiments described herein. Some of the embodiments described herein include vehicular micro clouds. For example, some or all of the vehicles which are registered with the ride system are connected vehicles (e.g., vehicles that include a processor, a communication unit, and an instance of the ride system) and members of a vehicular micro cloud. In some embodiments, the vehicular micro cloud hosts the ride system in a distributed fashion using the computing resources of the vehicles that are members of the vehicular micro cloud so that a cloud server and/or an edge server is not strictly necessary to provide the MoD service of the ride system to the users of the ride system. Some of the embodiments described herein do not include vehicular micro cloud.

In some embodiments, a server such as a cloud server and/or an edge server is also an element of the vehicle micro cloud.

In some embodiments, a vehicular micro cloud includes as a group of connected vehicles where vehicles perform task(s) cooperatively/collaboratively. Vehicular micro clouds can be divided into two categories based on their mobility: (1) stationary; and (2) mobile.

In the stationary cloud, a certain geographical region is designated as the vehicular micro cloud region, and vehicles entering that region contribute their resources for vehicular cloud services. A stationary vehicular micro cloud is sometimes referred to as a "static" vehicular micro cloud.

In the mobile vehicular cloud, on the other hand, the vehicular micro cloud moves as the micro cloud members move. A mobile vehicular micro cloud is sometimes referred to as a "dynamic" vehicular micro cloud.

In some embodiments, as an optional operating environment, the ride system is hosted by a plurality of members of a vehicular micro cloud. These members are also registered with the ride system. The ride system causes the vehicles, which each include an instance of the ride system or at least a subset of the code and routines of the ride system, to execute steps to form the vehicular micro cloud.

Member data includes digital data that describes information about a vehicular micro cloud and its members. For example, the member data is digital data that describes the identity of the members of the vehicular micro cloud and their specific computing resources; all members of the vehicular micro cloud make their computing resources available to one another for their collective benefit. An example of the member data according to some embodiments includes the member data 171 depicted in FIG. 1. In some embodiments, the ride system 199 cause the communication unit to transmit a wireless message to candidates for membership in the vehicular micro cloud that causes these candidates to join the vehicular micro cloud. The list of candidates is determined by the ride system based on the technical data which is transmitted by the candidates to one another via BSMs; in some embodiments, these BSMs also include sensor data recorded by the vehicles that transmit the BSMs. Vehicular micro clouds are described in more detail below according to some embodiments.

Vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task. An example of a task includes, for example, determining and executing vehicle driving maneuvers that minimize a risk of unsafe driving behavior by one or more drivers given the current driving contexts of these drivers.

In some embodiments, the vehicular micro cloud tasks provided by the vehicular micro cloud includes some or all of the tasks which are necessary to provide the functionality of the ride system described herein. In some embodiments, a vehicular micro cloud includes a group of connected vehicles that communicate with one another via V2X messages to provide a MoD service to the users of the MoD service.

The vehicular micro cloud includes multiple members. A member of the vehicular micro cloud includes a connected vehicle that sends and receives V2X messages via the network (e.g., the network 105 depicted in FIG. 1). In some embodiments, the network is a serverless ad-hock vehicular network. In some embodiments, the members of the network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set.

In some embodiments, an operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but is able to provide shared rides to users because the driver of the legacy vehicle has a smart device (e.g., an electronic processor-based computing device such as a smartphone, smartwatch, tablet computer, laptop, smart glasses, etc.) which they use to receive information that enables them to participate as registered vehicles that provide shared rides to the users of the MoD service provided by the ride system.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure that is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "vehicular micro cloud" since a vehicular micro cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., some or all of the system data 129 described herein), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "vehicular micro cloud tasks" if plural, or a "vehicular micro cloud task" if singular.

In some embodiments, a vehicular micro cloud task includes any computational, data storage, or data communication task collaboratively performed by a plurality of the members of a vehicular micro cloud. In some embodiments, the set of tasks described above with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to solve a problem (e.g., providing a MoD service), and the result includes digital data that describes the solution to the problem (e.g., determining matching data based on matrix data and a set of request data from a plurality of users, sending a vehicle to pick up a set of matched users, instructing the vehicle in how to complete the shared ride, receiving feedback data following the conclusion of the ride, updating the matrix data, etc.). In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks (e.g., the provision of a MoD service by executing the ride system) that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

In some embodiments, the functionality provided by the ride system is a task provided by the vehicular micro cloud. For example, the ride system is an element of a hub of a vehicular micro cloud. The ride system receives a set of wireless messages and this triggers the ride system to form a vehicular micro cloud. The ride system processes V2X data for the benefit of one or more members of the vehicular micro cloud. For example, the ego vehicle includes computational power that exceeds that of another member, and the ego vehicle processes wireless messages for this member which would otherwise be unable to do so, or unable to do so in a timeframe that satisfies a threshold for latency. Hub vehicles are described in more detail below.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote connected vehicle depicted in FIG. 1 are connected vehicles.

A connected vehicle is a conveyance, such as an automobile, that includes a communication unit that enables the conveyance to send and receive wireless messages via one or more vehicular networks. The embodiments described herein are beneficial for both drivers of human-driven vehicles as well as the autonomous driving systems of autonomous vehicles. For example, the ride system improves the performance of a vehicle control system, which benefits the performance of the vehicle itself by enabling it to operate more safety or in a manner that is more satisfactory to a human driver of the ego vehicle.

In some embodiments, the ride system improves the performance of a network because it beneficially takes steps enable the completion of vehicular micro cloud tasks.

In some embodiments, the ride system improves the performance of a connected vehicle because it beneficially enables the vehicle to participate in providing shared rides to users of the MoD service provided by the ride system.

In some embodiments, the ride system is software installed in an onboard unit (e.g., an electronic control unit (ECU)) of a vehicle having V2X communication capability.

The vehicle is a connected vehicle and operates in a roadway environment with N number of remote connected vehicles that are also connected vehicles, where N is any positive whole number that is sufficient to satisfy a threshold for forming a vehicular micro cloud. The roadway environment may include one or more of the following example elements: an ego vehicle; N remote connected vehicles; an edge server; and a roadside unit. For the purpose of clarity, the N remote connected vehicles may be referred to herein as the "remote connected vehicle" or the "remote connected vehicles" and this will be understood to describe N remote connected vehicles.

In some embodiments, the ride system includes code and routines stored on and executed by a cloud server or an edge server.

An example of a roadway environment according to some embodiments includes the roadway environment 140 depicted in FIG. 1. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote connected vehicles may be human-driven vehicles, autonomous vehicles, or a combination of human-driven vehicles and autonomous vehicles. In some embodiments, the ego vehicle and the remote connected vehicles may be equipped with DSRC equipment such as a GPS unit that has lane-level accuracy and a DSRC radio that is capable of transmitting DSRC messages.

In some embodiments, the ego vehicle and some or all of the remote connected vehicles include their own instance of a ride system. For example, in addition to the ego vehicle, some or all of the remote connected vehicles include an onboard unit having an instance of the ride system installed therein.

In some embodiments, the ego vehicle and one or more of the remote connected vehicles are members of a vehicular micro cloud. In some embodiments, the remote connected vehicles are members of a vehicular micro cloud, but the ego vehicle is not a member of the vehicular micro cloud. In some embodiments, the ego vehicle and some, but not all, of the remote connected vehicles are members of the vehicular micro cloud. In some embodiments, the ego vehicle and some or all of the remote connected vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1. The vehicular micro cloud 194 is depicted in FIG. 1 using a dashed line to indicate that it is an optional feature of the operating environment 100.

Accordingly, in some embodiments multiple instances of the ride system are installed in a group of connected vehicles. The group of connected vehicles are arranged as a vehicular micro cloud. As described in more detail below, the ride system further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

Hub or Hub Vehicle

Hub vehicles are an optional feature of the embodiments described herein. Some of the embodiments described herein include a hub vehicle. Some of the embodiments described herein do not include a hub vehicle.

In some embodiments, the ride system that executes a method as described herein (e.g., the method 300 depicted in FIG. 3 or the example general method described herein, etc.) is an element of a hub or a hub vehicle. For example, the vehicular micro cloud formed by the ride system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the operating environment 100 includes a roadside unit or some other roadway device, and this roadway device is the hub of the vehicular micro cloud.

In some embodiments, the ride system determines which member vehicle from a group of vehicles (e.g., the ego vehicle and one or more remote connected vehicles) will serve as the hub vehicle based on a set of factors that indicate which vehicle (e.g., the ego vehicle or one of the remote connected vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the ride system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include Basic Safety Messages (BSMs) which include such sensor data in part 2 of their payload. In some embodiments, the technical data is included in the member data (and/or sensor data) depicted in FIG. 1 which vehicles such as the ego vehicle 123 and the remote connected vehicle 124 broadcast to one another via BSMs. In some embodiments, the member data also includes the sensor data of the vehicle that transmits the BSM as well as some or all of the other digital data described herein as being an element of the member data.

In some embodiments, the technical data is an element of the sensor data (e.g., ego sensor data or remote sensor data provided by the remote connected data) which is included in the V2X data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the ride system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the ride system. For example, the ride system is an element of a roadside unit that includes a communication unit 145 but not a server. In another example, the ride system is an element of another vehicle such as one of the remote connected vehicles 124.

In some embodiments, the operating environment of the ride system includes servers. Optionally, in these embodiments the ride system includes code and routines that predict the expected latency of V2X communications involving serves and then time the transmission of these V2X communications so that the latency is minimized or reduced.

In some embodiments, the ride system is operable to provide its functionality even though the vehicle which includes the ride system does not have a Wi-Fi antenna as part of its communication unit. By comparison, some of the existing solutions require the use of a Wi-Fi antenna in order to provide their functionality. Because the ride system does not require a Wi-Fi antenna, it is able to provide its functionality to more vehicles, including older vehicles without Wi-Fi antennas.

In some embodiments, the ride system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the ride system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud. In some embodiments, vehicles which the ride system determines are ineligible to participate as members of the vehicular micro cloud are also excluded from providing rides to users as part of the MoD service.

In some embodiments, the ride system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the ride system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, in some but not all embodiments, any group of vehicles that includes a server or whose functionality incorporates a server is not a vehicular micro cloud as this term is used herein.

In some embodiments, a vehicular micro cloud formed by a ride system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the ride system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 300 depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the ride system, the server is an optional feature of the operating environment. An example of a preferred embodiment of the ride system does not include the server in the operating environment which includes the ride system.

In some embodiments, the ride system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the ride system requires vehicular micro cloud; this distinction alone differentiates the ride system from the existing solutions. The ride system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which sub-task they are performing among themselves while the sub-tasks are still being performed by the platoons in parallel. The existing solution also does not include functionality whereby platoons are re-organized based on monitored task executions results/performance and/or available vehicles and resources. As described herein, the ride system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 1 and 2.

A particular vehicle that includes these vehicle control systems is referred to herein as an "ego vehicle" and other vehicles in the vicinity of the ego vehicle as "remote connected vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the ride system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the ride system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the ride system includes software installed in an onboard unit of a connected vehicle. This software is the "ride system" described herein.

An example operating environment for the embodiments described herein includes an ego vehicle, one or more remote connected vehicles, and a recipient vehicle. The ego vehicle the remote connected vehicle are connected vehicles having communication units that enable them to send and receive wireless messages via one or more vehicular networks. In some embodiments, the recipient vehicle is a connected vehicle. In some embodiments, the ego vehicle and the remote connected vehicle include an onboard unit having a ride system stored therein.

Some of the embodiments described herein include a server. However, some of the embodiments described herein do not include a server. A serverless operating environment is an operating environment which includes at least one ride system and does not include a server.

In some embodiments, the ride system includes code and routines that are operable, when executed by a processor of the onboard unit, to cause the processor to execute one or more of the steps of the method 300 depicted in FIG. 3 or any other method described herein (e.g., the example general method).

This patent application is related to U.S. patent application Ser. No. 15/644,197 filed on Jul. 7, 2017 and entitled "Computation Service for Mobile Nodes in a Roadway Environment," the entirety of which is hereby incorporated by reference. This patent application is also related to U.S. patent application Ser. No. 16/457,612 filed on Jun. 28, 2019 and entitled "Context System for Providing Cyber Security for Connected Vehicles," the entirety of which is hereby incorporated by reference.

Example Overview

In some embodiments, the ride system is software that is operable, when executed by a processor, to cause the processor to execute one or more of the methods described herein. An example operating environment 100 for the ride system is depicted in FIG. 1.

In some embodiments, the ride system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. For example, the communication unit 145 includes a C-V2X radio. FIG. 1 depicts an example operating environment 100 for the ride system 199 according to some embodiments.

Example Operative Environment

Embodiments of the ride system are now described. Referring now to FIG. 1, depicted is a block diagram illustrating an operating environment 100 for a ride system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123") operated by a driver 109; a remote connected vehicle 124 (which has a driver too, which is not pictured, in embodiments where the remote connected vehicle 124 is not at least a Level III autonomous vehicle); a cloud server 103; an edge server; a first user device 117 operated by a first user 107; and a second user device 118 operated by a second user 108. These elements are communicatively coupled to one another via a network 105. These elements of the operating environment 100 are depicted by way of illustration. In practice, the operating environment 100 may include one or more of the elements depicted in FIG. 1. For example, although only two users 107, 108, two user devices 117, 118, and two vehicles 123, 124 are depicted in FIG. 1, in practice the operating environment 100 can include a plurality of these elements.

The operating environment 100 also includes the roadway environment 140. The roadway environment 140 was described above, and that description will not be repeated here.

In some embodiments, one or more of the ego vehicle 123, the remote connected vehicle 124, and the network 105 are elements (e.g., members) of a vehicular micro cloud 194. One or more of the first user device 117 and the second user device 118 are also elements of the vehicular micro cloud 194 in some embodiments.

In some embodiments, the ego vehicle 123 and the remote connected vehicle 124 include similar elements. For example, each of these elements of the operating environment 100 include their own processor 125, bus 121, memory 127, communication unit 145, processor 125, sensor set 126, onboard unit 139, standard-compliant GPS unit 150, and ride system 199. These elements of the ego vehicle 123 and the remote connected vehicle 124 provide the same or similar functionality regardless of whether they are included in the ego vehicle 123 or the remote connected vehicle 124. Accordingly, the descriptions of these elements will not be repeated in this description for each of the ego vehicle 123 and the remote connected vehicle 124.

In the depicted embodiment, the ego vehicle 123 and the remote connected vehicle 124 store similar digital data. The system data 129 includes digital data that describes some or all of the digital data stored in the memory 127 or otherwise described herein. The system data 129 is depicted in FIG. 1 as being an element of the cloud server 103, but in practice the system data 129 is stored on one or more of the server, the ego vehicle 123, and one or more of the remote connected vehicles 124.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. The vehicular micro cloud 194 is depicted with a dashed line in FIG. 1 to indicate that it is an optional element of the operating environment 100.

In some embodiments, the vehicular micro cloud 194 includes a stationary vehicular micro cloud or a mobile vehicular micro cloud. For example, each of the ego vehicle 123 and the remote connected vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963.

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

In some embodiments, the operating environment 100 includes a plurality of vehicular micro clouds 194. For example, the operating environment 100 includes a first vehicular micro cloud and a second vehicular micro cloud.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote connected vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

In some embodiments, the vehicular micro cloud 194 does not include a hardware server. Accordingly, in some embodiments the vehicular micro cloud 194 may be described as serverless.

In some embodiments, the vehicular micro cloud 194 includes a server. For example, in some embodiments the vehicular micro cloud 194 includes the cloud server 103.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

In some embodiments, the network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote connected vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote connected vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 includes a car, a truck, a sports utility vehicle, a bus, a semi-truck, a drone, or any other roadway-based conveyance. In some embodiments, the ego vehicle 123 includes an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers. In some embodiments, the vehicle control system 153 is an autonomous driving system.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153; a communication unit 145; an onboard unit 139; a memory 127; and a ride system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; an navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the ride system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 is a roadway that includes a roadway region. The ego sensor data 195 may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the ride system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the ride system 199 provides its functionality as described herein with reference to the method 300 depicted in FIG. 3 and/or the example general method described herein.

In some embodiments, the sensor set 126 includes any sensors that are necessary to record ego sensor data 195 that describes the roadway environment 140 in sufficient detail to create a digital twin of the roadway environment 140. In some embodiments, the ride system 199 generates the set of nano clouds and assigns sub-tasks to the nano clouds based on the outcomes observed by the ride system 199 during the execution of a set of digital twins that simulate the real-life circumstances of the ego vehicle 123.

For example, in some embodiments the ride system 199 includes simulation software. The simulation software is any simulation software that is capable of simulating an execution of a vehicular micro cloud task. For example, the simulation software is operable simulate the ride system 199 providing its functionality to generate some or all of the system data 129. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the ride system 199. In some other embodiments, the simulation software is a standalone software that the ride system 199 can access to execute digital twin simulations to determine the best way to divide the vehicular micro cloud 194 into nano clouds and which sub-tasks to assign which nano clouds. The digital twin simulations may also be used by the ride system 199 to determine how to break down the vehicular micro cloud task into sub-tasks.

Digital twins, and an example process for generating and using digital twins which is implemented by the ride system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The ego sensor data 195 includes digital data that describes any measurement that is taken by one or more of the sensors of the sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote connected vehicle 124, the ego vehicle 123, or some other tangible object or construct located in a roadway environment 140) is now described according to some embodiments. In some embodiments, the ride system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the ride system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the ride system 199 to determine the lane of travel of the ego vehicle 123. This measurement improves the accuracy of the GPS data describing the location of lanes used by the ego vehicle 123 when the ride system 199 is providing its functionality.

In some embodiments, the memory 127 stores two types of GPS data. The first is GPS data of the ego vehicle 123 and the second is GPS data of one or more objects (e.g., the remote connected vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit 150 is a sensor included in the sensor set 126 and the GPS data is an example type of ego sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the ride system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the ride system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the ego sensor data 195; the threshold data 196; the member data 171; the service profile data 128; the digital twin data 162; the V2X data 133; the GPS data 167; the prediction data 163; the matching data 169; the matrix data 175; the request data 173; the feedback data 134; the GUI data 186; the driver profile data 168; the vehicle profile data 164; and the user profile data 165. The system data 129 includes some or all of this digital data. In some embodiments, the V2X messages (or C-V2X messages or the set of wireless messages) described herein are also stored in the memory 127. The above-described elements of the memory 127 were described above, and so, those descriptions will not be repeated here.

In some embodiments, the ego vehicle 123 includes a vehicle control system 153. A vehicle control system 153 includes one or more ADAS systems or an autonomous driving system. In some embodiments, the ride system 199 uses some or all of the payload of the set of wireless messages described herein as inputs to the vehicle control system 153 to improve the operation of the vehicle control system 153 by increasing the quantity of data it has access to when controlling the operation of the ego vehicle 123.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness ride system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the ride system 199 includes code and routines that are operable, when executed by the processor 125, to execute one or more steps of the example general method described herein. In some embodiments, the ride system 199 includes code and routines that are operable, when executed by the processor 125, to execute one or more steps of the method 300 described below with reference to FIG. 3.

Figure 2:
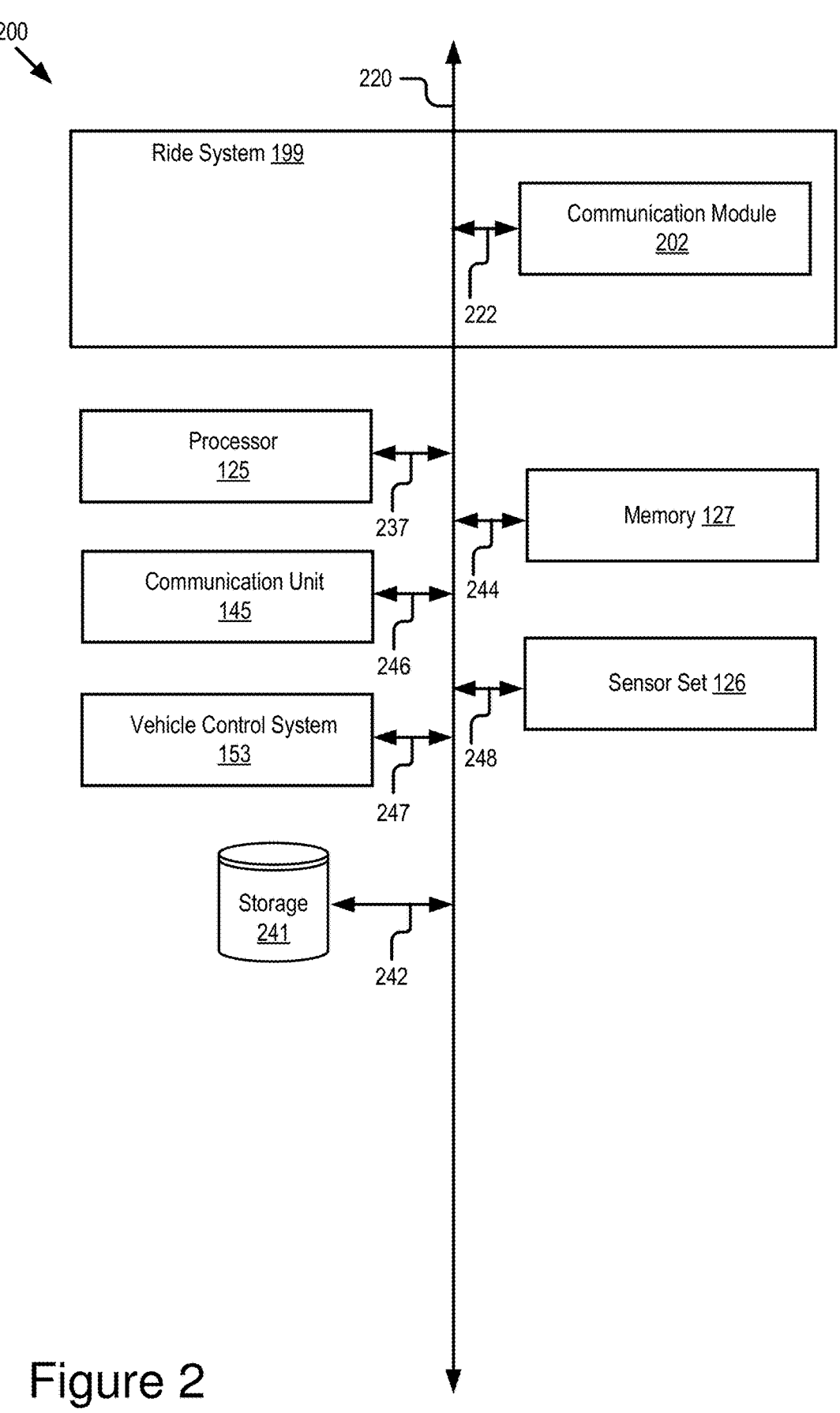
FIG. 2 is a block diagram illustrating an example computer system including a ride system according to some embodiments.

An example embodiment of the ride system 199 is depicted in FIG. 2. This embodiment is described in more detail below.

In some embodiments, the ride system 199 is an element of the onboard unit 139 or some other onboard vehicle computer. In some embodiments, the ride system 199 includes code and routines that are stored in the memory 127 and executed by the processor 125 or the onboard unit 139. In some embodiments, the ride system 199 is an element of an onboard unit of the ego vehicle 123 which executes the ride system 199 and controls the operation of the communication unit 145 of the ego vehicle 123 based at least in part on the output from executing the ride system 199.

In some embodiments, the ride system 199 is implemented using hardware including a field-programmable gate array ("FPGA") or an application-specific integrated circuit ("ASIC"). In some other embodiments, the ride system 199 is implemented using a combination of hardware and software.

In some embodiments, the ride system 199 is an element of the cloud server 103 and not an element of the ego vehicle 123 or any other vehicle such as the remote connected vehicle 124.

The remote connected vehicle 124 includes elements and functionality which are similar to those described above for the ego vehicle 123, and so, those descriptions will not be repeated here. In some embodiments, the ego vehicle 123 and the remote connected vehicle 124 are members of a vehicular micro cloud 194.

The roadway environment 140 is now described according to some embodiments. In some embodiments, some, or all of the ego vehicle 123 and the remote connected vehicle 124 (or a plurality of remote connected vehicles) are located in a roadway environment 140. In some embodiments, the roadway environment 140 includes one or more vehicular micro clouds 194. The roadway environment 140 is a portion of the real-world that includes a roadway, the ego vehicle 123 and the remote connected vehicle 124. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 197. The remote sensor data 197 includes digital data that describes the sensor measurements recorded by the sensor set 126 of the remote connected vehicle 124.

In some embodiments, the real-world includes the real of human experience comprising physical objects and excludes artificial environments and "virtual" worlds such as computer simulations.

In some embodiments, the roadway environment 140 includes a roadside unit that in includes an edge server 198. In some embodiments, the edge server 198 is a connected processor-based computing device that includes an instance of the ride system 199 and the other elements described above with reference to the ego vehicle 123 (e.g., a processor 125, a memory 127 storing the system data 129, a communication unit 145, etc.). In some embodiments, the roadway device is a member of the vehicular micro cloud 194.

In some embodiments, the edge server 198 includes one or more of the following: a hardware server; a personal computer; a laptop; a device such as a roadside unit; or any other processor-based connected device that is not a member of the vehicular micro cloud 194 and includes an instance of the ride system 199 and a non-transitory memory that stores some or all of the digital data that is stored by the memory 127 of the ego vehicle 123 or otherwise described herein. For example, the memory 127 stores the system data 129. The system data 129 includes some or all of the digital data depicted in FIG. 1 as being stored by the memory 127.

In some embodiments, the edge server 198 includes a backbone network. In some embodiments, the edge server 198 includes an instance of the ride system 199. The functionality of the ride system 199 is described above with reference to the ego vehicle 123, and so, that description will not be repeated here.

In some embodiments, the cloud server 103 one or more of the following: a hardware server; a personal computer; a laptop; a device such as a roadside unit; or any other processor-based connected device that is not a member of the vehicular micro cloud 194 and includes an instance of the ride system 199 and a non-transitory memory that stores some or all of the digital data that is stored by the memory 127 of the ego vehicle 123 or otherwise described herein. For example, the memory 127 stores the system data 129. In some embodiments, the cloud server 103 is operable to receive requests that include request data 173 from endpoints of the network 105 (e.g., the first user device 117, the second user device 118, a user device of the driver 109 (not pictured) which is similar to the first user device 117 and/or the second user device 118) and provide a MoD service to the users of these endpoints of the network 105 responsive to these requests. For example, the ride system 199 takes steps to provide a shared ride as described herein with reference to the method 300 of FIG. 3 and the example general method described herein.

In some embodiments, the cloud server 103 includes a data structure 131. The data structure 131 includes a non-transitory memory that stores an organized set of digital data.

For example, the data structure 131 includes an organized set of driver profile data 168 for a plurality of different drivers (e.g., the drivers of the ego vehicle 123 and the remote connected vehicle 124). In some embodiments, the data structure 131 includes an organized set of vehicle profile data 164 for each vehicle that is registered with the ride system 199 by the provision of the vehicle profile data 164 to the ride system 199.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote connected vehicle 124, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the ride system 199 includes encryption keys for encrypting wireless messages and decrypting the wireless messages described herein.

The first user device 117 and the second user device 118 include similar elements and functionality, and so, those descriptions will not be repeated here. In some embodiments, the driver 109 has a third user device which is not pictured here and also includes similar elements and functionality as the first user device 117 and the second user device 118. The first user device 117 is now described, and this description also applies to the second user device 118 and the third user device if present.

The first user device 117 includes one or more of the following: a smartphone; a smartwatch; a tablet computer; a personal computer; a laptop; a vehicle infotainment system; an onboard vehicle computer system; and any other processor-based connected device that includes a communication unit and a non-transitory memory that stores the system data 129. In some embodiments, the first user device 117 includes an electronic display device for the displaying of GUIs such as those generated by a processor executing the GUI data 186.

In some embodiments, the first user device 117 includes a software application which is a client of the ride system 199. The software application includes code and routines that enable the first user device 117 to communicate with the ride system 199 via the network 105, for example, to provide request data 173, user profile data 165, service profile data 128, etc., to the ride system 199. For example, the software application is a smartphone application or a browser interface which the first user 107 uses to interact with the ride system 199 via the first user device 117. The software application also causes the electronic display of the first user device 117 to display messages to the first user 107 from the ride system 199 and inform the first user 107 about their ride options, the status of their ride, and financial information relating to their ride (cost, credit card information, etc.).

Referring now to FIG. 2, depicted is a block diagram illustrating an example computer system 200 including a ride system 199 according to some embodiments.

In some embodiments, the computer system 200 may include a special-purpose computer system that is programmed to perform one or more steps of one or more of the method 300 described herein with reference to FIG. 3 and the example general method described herein.

In some embodiments, the computer system 200 may include a processor-based computing device. For example, the computer system 200 may include an onboard vehicle computer system of the ego vehicle 123 or the remote connected vehicle 124.

The computer system 200 may include one or more of the following elements according to some examples: the ride system 199; a processor 125; a communication unit 145; a vehicle control system 153; a storage 241; and a memory 127. The components of the computer system 200 are communicatively coupled by a bus 220.

In some embodiments, the computer system 200 includes additional elements such as those depicted in FIG. 1 as elements of the ride system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the ride system 199 includes code and routines that are operable, when executed by the processor 125, to cause the processor 125 to execute one or more steps of the method 300 described herein with reference to FIG. 3. In some embodiments, the ride system 199 includes code and routines that are operable, when executed by the processor 125, to cause the processor 125 to execute one or more steps of the example general method.

In the illustrated embodiment shown in FIG. 2, the ride system 199 includes a communication module 202.

The communication module 202 can be software including routines for handling communications between the ride system 199 and other components of the computer system 200. In some embodiments, the communication module 202 can be a set of instructions executable by the processor 125 to provide the functionality described below for handling communications between the ride system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the ride system 199 and stores the data in one or more of the storage 241 and the memory 127.

In some embodiments, the communication module 202 may handle communications between components of the ride system 199 or the computer system 200.

Referring now to FIG. 3, depicted is a flowchart of an example method 300. The method 300 includes step 305, step 310, and step 315 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

The existing solutions do not determine matrix data or use matrix data to match users for a shared ride as is done by the ride system. The existing solutions also do not predict response information when such response information is missing within the matrix data. The existing solutions do not consider the importance of understanding granular information when matching users for a shared ride. The existing solutions also do not focus on the importance of multiple-origin-multiple-destination trips as is done by some embodiments of the ride system.

The existing solutions do not utilize vehicular micro clouds to implement a MoD service. The existing solutions also do not use digital twin simulations or other methods described herein to determine prediction data.

The existing references also do not describe vehicular micro clouds as described herein. Some of the existing solutions require the use of vehicle platooning. A platoon is not a vehicular micro cloud and does not provide the benefits of a vehicular micro cloud, and some embodiments of the ride system that require a vehicular micro cloud. For example, among various differences between a platoon and a vehicular micro cloud, a platoon does not include a hub or a vehicle that provides the functionality of a hub vehicle. By comparison, in some embodiments the ride system includes codes and routines that are operable, when executed by a processor, to cause the processor to utilize vehicular micro clouds to resolve version differences among common vehicle applications installed in different connected vehicles.

Referring now to FIG. 4, depicted is a block diagram of an example process flow 400 of the ride system according to some embodiments. A first user and a second user use their user devices to provide request data for these users to the ride system. In this example, the first user and the second user have previously provided their service profile data to the ride system so that the matrix data includes response information for the first user and the second user. The ride system determines prediction data as determined to improve the matrix data. In some embodiments, the prediction data is determined when the matrix data is missing response information for a threshold number of attributes or incentives which are available to the first user and the second user. The ride system determines matching data matching the first user and the second user for a shared ride. The ride system determines GUI data which is customized (e.g., personalized) for the first user and the second user based on their response information and granularity information for the different attributes/incentives. In this way the GUIs generated by the user devices of the first user and the second user are personalized to the interests or preferences of these users. The GUI data is delivered to the user devices and the GUIs are displayed by these devices.

Referring to FIG. 5, depicted is a block diagram of an example of a user profile described by an example of the user profile data 165 according to some embodiments.

As depicted in FIG. 5, the example user profile includes several "user attributes" which describe the user and several "pairing user attributes" which describe the user's preference for who they would prefer to be matched with by the ride system for a shared ride. The "trip features" depicted in FIG. 5 are an element of the request data that describe some of the information about a particular shared ride which is requested by the user. The traffic conditions, traveling distance, and cost are elements of the user's user profile in some embodiments.

Alternative embodiments of the analysis provided by the ride system are now described. These alternative embodiments describe example types of analysis executed by the ride system to estimate a user's response to a shared ride so that they are more likely to request or enjoy a shared ride provided by the ride system in the future.

In some embodiments, to evaluate the average response of a "matching decision" D on a population of users under varying background characteristics vector $X=[x_1, x_2, \ldots, x_n]$, two alternative methods can be used by the ride system: a controlled experiment; and observational studies.

For a controlled experiment, the ride system chooses two random groups: a matched group for whom the ride system made a matching decision; and a control group to compare/measure the average outcome. Large random group sizes balance out the effect of X on both groups.

For observational studies: observations of matched and control groups are not random, but the control group is selected to "match" the effects of X on the matched group to draw the causal effect of the matching by the ride system. See, also, FIG. 7 which includes a matched group and a control group. In the example depicted in FIG. 7 the matched group is for the attribute whose responses are identified by $R_2$. The ride system executes the analysis depicted in FIG. 7 to determine response information for the attribute whose responses are identified by $R_2$.

In some embodiments, the ride system includes a Propensity Score Matching (PSM) algorithm and uses PSM to provide its functionality. PSM uses a Propensity Score that consolidates the effect of Xi's weighted by their importance ("i"), to match matched groups (or individual users within matched groups) with the right control groups (or individuals within the control groups).

In this way, the ride system conducts experiments to identify on a user-by-user basis what their response is to different ride attributes or incentives to determine which combination of attributes and/or incentives yields the most positive response possible relative to other combinations of attributes and/or incentives. The ride system stores this information in the matrix data over time and uses this information to improve the experience of the user and workload of vehicles that are registered with the MoD service provided by the ride system.

Referring to FIG. 6, depicted is a block diagram of an example of a service profile described by an example of the service profile data 128 according to some embodiments. In the right-hand column is labeled "System Response (R)," which is a user's response information for a particular attribute, which are indicated in the column labeled "Attributes."

Referring to FIG. 7, depicted is a block diagram of an example of a response matrix described by an example of the matrix data 175 according to some embodiments. The response matrix includes interpolated responses of some of the users for matching a plurality of the users for a shared ride according to some embodiments.

In some embodiments, the ride system executes an observational studies-based method to determine how to maximize the positive response of users to the matching decisions of users, vehicles, and drivers for a shared ride as provided by the ride system.

A "population" includes a set of users of the ride system $\{u_1, u_2, \ldots, u_p\}$. These users may or may not have a history of shared rides with the ride system. For example, the user $u_9$ depicted in FIG. 7 has no history without ride system and all of their response information is based on prediction data.

The user profile data for the population of users is included in the matrix data. The matrix data also includes a "portfolio of responses R" $\{R_1, R_2, \ldots, R_m\}$ representing the response information for the users to various incentives and/or attributes (as well as marketing campaigns) to positively encourage (cause) users to share a ride with other users.

The "R2 response group" depicted in FIG. 7 is an example of a matched group as described above for FIG. 5. The R2 response group includes a group of users taking part in a shared ride with the ride system making a particular assumption about predicted user response based on the assumption (e.g., a positive outcome). The assumption includes any assumption that the ride system makes when matching users for a shared ride; the assumption includes something about how to interpret the response information so as to increase the likelihood that the users will enjoy their shared ride and/or be more likely to request a shared ride in the future. An observed outcome as depicted in the matrix data includes an actual outcome based on a shared ride experienced by a user and recorded by their feedback data. The control group includes the group of users who experienced a shared ride without the ride system implementing the assumption when matching users for a shared ride. In this way the control group beneficially helps the ride system to determine the impact of the assumption on influencing users to choose to request a shared ride.

Figure 8:
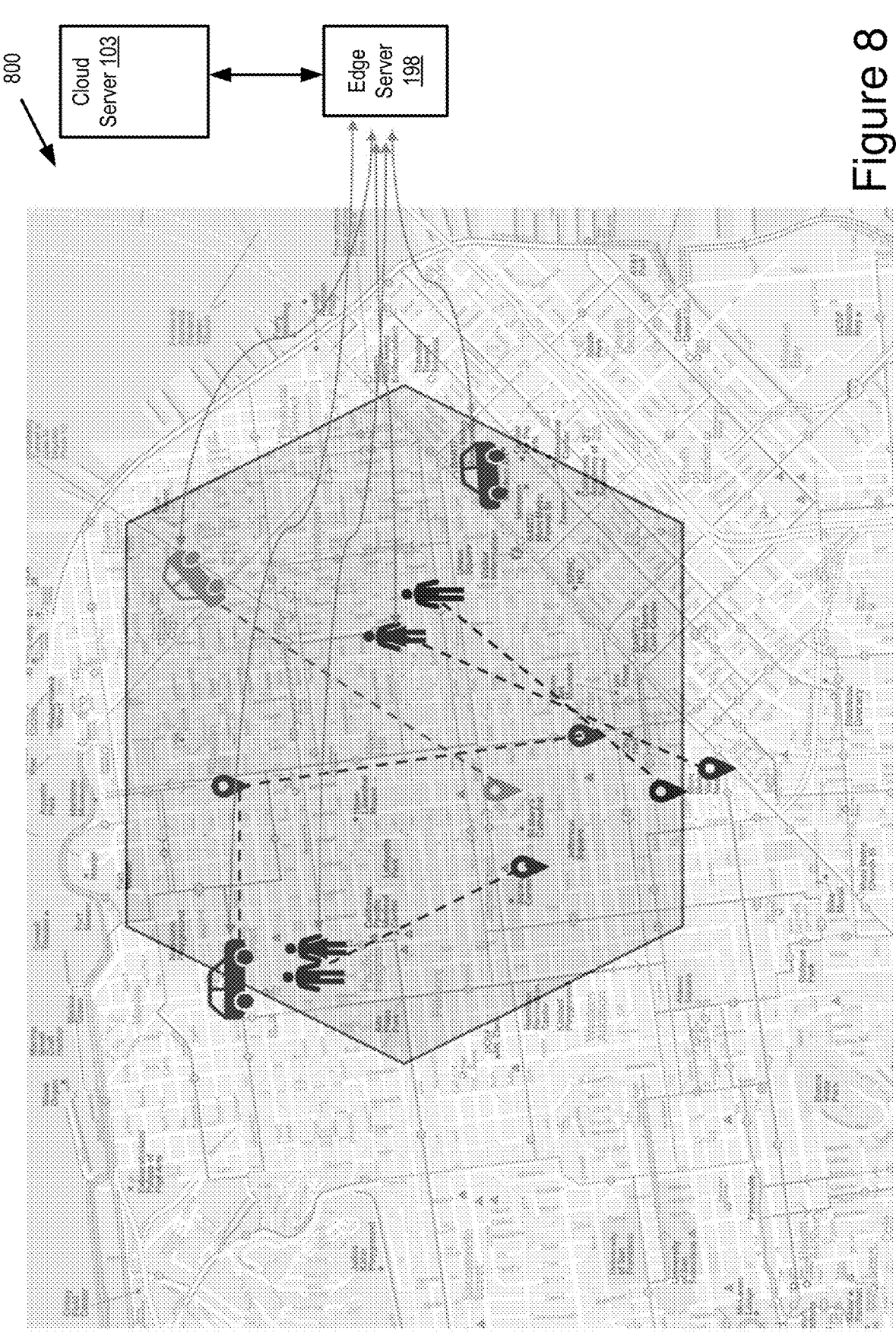
FIG. 8 is a block diagram of an example of architecture including the ride system according to some embodiments.

Referring to FIG. 8, depicted is a block diagram of an example of architecture 800 including the ride system according to some embodiments.

In some embodiments, each vehicle registered with the ride system provides an instances of vehicle profile data. Each user has an instance of service profile data registered with the ride system. In some embodiments, one or more of the vehicle profile data and the service profile data are updated by the ride system after each ride that occurs that includes the vehicle and the one or more service profiles associated with the vehicle profile data and the service profile data.

In some embodiments, the service profile data for a plurality of users is organized into a response matrix which is described by matrix data such as the example depicted in FIG. 7.

In some embodiments, a geographic area is split into geofenced sectors targeting registered vehicles and registered users (breaching or dwelling the sector) including: active rides; ride requests; and registered vehicles that are available to provide rides. The entities within a geofenced sector are associated with an edge and/or cloud servers to assist with timely MoD service request fulfillment and provide computational needs during the provision of shared rides matched by the ride system including access to their profiles, matching protocols, and algorithms and monitoring the progress of the rides, etc.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data ride system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data ride system to become coupled to other data ride systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for providing a mobility-on-demand service, the method comprising:

receiving feedback from a first set of users that share a first shared ride, wherein the feedback describes their individual satisfaction with different ride attributes of the first shared ride;

scoring an effect of the different ride attributes on different individual users from the first set;

generating prediction data by identifying for the different individual users what their personal response is to different ride attributes to determine an optimum combination of ride attributes for all similar users that yields a most positive response possible relative to other combinations of attributes and wherein the prediction data describes the optimum combination;

updating, by a processor, a response matrix to include the prediction data so that the processor is able to identify the optimum combination on a user-by-users basis based on the prediction data describing the optimum combination, wherein the response matrix includes digital data describing historical user satisfaction with a plurality of shared rides over time and the prediction data;

matching, by the processor, a second set of users to a second shared ride based on service profile data for the users indicating the second set of users is similar to the first set of users and the response matrix wherein the mobility-on-demand service is operable to provide a personalized pairing orchestration among the second set of users and the second shared ride based on the digital data and the prediction data included in the response matrix; and autonomously navigating an autonomous vehicle to provide the second shared ride based on the matching, wherein the autonomous vehicle uses the response matrix and the prediction data to determine a navigation route that optimizes the ride share attributes for the second set of users.

2. The method of claim 1, wherein the first set of users includes a control group of users and a non-control group of users.

3. The method of claim 2, wherein the scoring considers the feedback of the control group of users and the non-control group of users.

4. The method of claim 1, wherein the method is executed by a processor of a hardware server.

5. The method of claim 1, wherein the response matrix includes interpolated responses which are inferred by the processor.

6. The method of claim 1, wherein the response matrix includes interpolated responses which are inferred by the processor based on a set of digital twin simulations.

7. The method of claim 1, wherein the method is executed by an onboard vehicle computer of a vehicle.

8. The method of claim 1, wherein the method is executed by onboard vehicle computers of one or more vehicles that are members of a vehicular micro cloud.

9. The method of claim 8, wherein the vehicular micro cloud does not include a server as a member of the vehicular micro cloud.

10. The method of claim 1, wherein one or more vehicles which provide the rides is an autonomous vehicle.

11. A system for providing a mobility-on-demand service comprising:

a non-transitory memory;

and a processor communicatively coupled to the non-transitory memory, wherein the non-transitory memory stores computer readable code that is operable, when executed by the processor, to cause the processor to execute steps including:

receiving feedback from a first set of users that share a first shared ride, wherein the feedback describes their individual satisfaction with different ride attributes of the first shared ride;

scoring an effect of the different ride attributes on different individual users from the first set;

generating prediction data by identifying for the different individual users what their personal response is to different ride attributes to determine an optimum combination of ride attributes for all similar users that yields a most positive response possible relative to other combinations of attributes and wherein the prediction data describes the optimum combination;

updating, by a processor, a response matrix to include the prediction data so that the processor is able to identify the optimum combination on a user-by-users basis based on the prediction data, wherein the response matrix includes digital data describing historical user satisfaction with a plurality of shared rides over time and the prediction data;

matching, by the processor, a second set of users to a second shared ride based on service profile data for the users indicating the second set of users is similar to the first set of users and the response matrix wherein the mobility-on-demand service is operable to provide a personalized pairing orchestration among the second set of users and the second shared ride based on the digital data and the prediction data included in the response matrix; and autonomously navigating an autonomous vehicle to provide the second shared ride based on the matching, wherein the autonomous vehicle uses the response matrix and the prediction data to determine a navigation route that optimizes the ride share attributes for the second set of users.

12. The system of claim 11, wherein one or more of the first shared ride, the plurality of shared rides, and the second shared ride are a multiple-origin-multiple-destination trip.

13. The system of claim 11, wherein each of the first shared ride, the plurality of shared rides, and the second shared ride are multiple-origin-multiple-destination trips.

14. The system of claim 11, wherein the steps are executed by a processor of a hardware server.

15. The system of claim 11, wherein the response matrix includes interpolated responses which are inferred by the processor.

16. The system of claim 11, wherein the response matrix includes interpolated responses which are inferred by the processor based on a set of digital twin simulations.

17. The system of claim 11, wherein the steps are executed by an onboard vehicle computer of a vehicle which includes the processor.

18. The system of claim 11, wherein the steps are executed by onboard vehicle computers of one or more vehicles that are members of a vehicular micro cloud.

19. The system of claim 18, wherein the vehicular micro cloud does not include a server as a member of the vehicular micro cloud.

20. A computer program product including computer code stored on a non-transitory memory that is operable, when executed by a processor, to cause the processor to execute operations for providing a mobility-on-demand service, the operations including:

receive feedback from a first set of users that share a first shared ride, wherein the feedback describes their individual satisfaction with different ride attributes of the first shared ride;

score an effect of the different ride attributes on different individual users from the first set;

generate prediction data by identifying for the different individual users what their personal response is to different ride attributes to determine an optimum combination of ride attributes for all similar users that yields a most positive response possible relative to other combinations of attributes and wherein the prediction data describes the optimum combination;

update, by the processor, a response matrix to include the prediction data so that the processor is able to identify the optimum combination on a user-by-users basis based on the prediction data, wherein the response matrix includes digital data describing historical user satisfaction with a plurality of shared rides over time and the prediction data;

match, by the processor, a second set of users to a second shared ride based on service profile data for the users indicating the second set of users is similar to the first set of users and the response matrix wherein the mobility-on-demand service is operable to provide a personalized pairing orchestration among the second set of users and the second shared ride based on the digital data and the prediction data included in the response matrix; and autonomously navigate an autonomous vehicle to provide the second shared ride based on the matching, wherein the autonomous vehicle uses the response matrix and the prediction data to determine a navigation route that optimizes the ride share attributes for the second set of users.

* * * * *